(12) United States Patent
Surjaatmadja et al.

(10) Patent No.: US 11,021,936 B2
(45) Date of Patent: Jun. 1, 2021

(54) UTILIZING ELECTRICALLY ACTUATED EXPLOSIVES DOWNHOLE

(71) Applicant: Halliburton Energy Services, Inc., Houston, TX (US)

(72) Inventors: Jim Basuki Surjaatmadja, Duncan, OK (US); Stanley V. Stephenson, Duncan, OK (US); Bryan John Lewis, Duncan, OK (US); Tim H. Hunter, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 316 days.

(21) Appl. No.: 16/315,465

(22) PCT Filed: Aug. 19, 2016

(86) PCT No.: PCT/US2016/047825
§ 371 (c)(1),
(2) Date: Jan. 4, 2019

(87) PCT Pub. No.: WO2018/034672
PCT Pub. Date: Feb. 22, 2018

(65) Prior Publication Data
US 2020/0040714 A1 Feb. 6, 2020

(51) Int. Cl.
*E21B 43/1185* (2006.01)
*E21B 33/138* (2006.01)
(Continued)

(52) U.S. Cl.
CPC ........ *E21B 43/1185* (2013.01); *E21B 33/138* (2013.01); *E21B 43/117* (2013.01);
(Continued)

(58) Field of Classification Search
CPC .... E21B 43/1185; E21B 43/11; E21B 43/116; E21B 43/117; E21B 43/263;
(Continued)

(56) References Cited

U.S. PATENT DOCUMENTS

| | | |
|---|---|---|
| 1,806,499 A | 5/1931 | Ranney et al. |
| 2,766,828 A | 10/1956 | Rachford, Jr. |

(Continued)

FOREIGN PATENT DOCUMENTS

| | | |
|---|---|---|
| EP | 0675262 B1 | 11/1999 |
| WO | 03/002849 A1 | 1/2003 |
| WO | 2018/084831 A1 | 5/2018 |

OTHER PUBLICATIONS

International Search Report and Written Opinion issued in related PCT Application No. PCT/US2016/047825 dated May 16, 2017, 19 pages.
(Continued)

*Primary Examiner* — George S Gray
(74) *Attorney, Agent, or Firm* — Thomas Rooney; Baker Botts L.L.P.

(57) ABSTRACT

Electrically ignitable and electrically controllable explosive material (EIECEM) may be disposed within a shaped charge for deployment downhole. An explosion of the EIECEM is controlled by limiting the duration of excitation at the EIECEM, for example, the duration that an electrical source provides an electrical charge, electrical current or electrical signal. The shaped charge may be insulated from an electrical source to prevent explosion of the EIECEM and coupled to the electrical source to create ignite or explode the EIECEM. A plurality of shaped charges may be disposed downhole and may be ignited or exploded in any suitable order. The EIECEM may be ignited multiple times such that multiple explosions are created. The explosion of the EIECEM creates or extends a perforation or fracture in a
(Continued)

formation. The shaped charges may be excited in a predetermined sequence and for a predetermined duration of time.

19 Claims, 13 Drawing Sheets

(51) Int. Cl.
    *E21B 43/117* (2006.01)
    *E21B 43/26* (2006.01)
    *E21B 43/263* (2006.01)
    *E21B 43/116* (2006.01)
    *F02K 9/26* (2006.01)

(52) U.S. Cl.
    CPC ............ *E21B 43/26* (2013.01); *E21B 43/263* (2013.01); *F02K 9/26* (2013.01)

(58) Field of Classification Search
    CPC .... E21B 33/138; E21B 43/26; E21B 43/2605; E21B 43/2607; E21B 43/27; F02K 9/26; F02K 9/92; F02K 9/94; F24D 1/05
    See application file for complete search history.

(56) References Cited

U.S. PATENT DOCUMENTS

| | | |
|---|---|---|
| 3,465,818 A | 9/1969 | Dixon |
| 3,688,843 A | 9/1972 | Nordyke |
| 3,999,609 A | 12/1976 | Field |
| 4,248,303 A | 2/1981 | Charpentier |
| 4,490,196 A | 4/1984 | Funk |
| 4,530,396 A | 7/1985 | Mohaupt |
| 4,683,943 A | 8/1987 | Hill et al. |
| 2006/0011276 A1* | 1/2006 | Grix .......................... F02K 9/26 149/1 |
| 2006/0137875 A1* | 6/2006 | Dusterhoft ........... C09K 8/5751 166/276 |
| 2009/0168606 A1* | 7/2009 | Lerche .................... E21B 47/12 367/197 |
| 2011/0067789 A1* | 3/2011 | Grix ......................... C06B 31/00 149/19.1 |
| 2012/0199031 A1* | 8/2012 | Lanclos ............... E21B 43/1185 102/206 |
| 2015/0096752 A1 | 4/2015 | Burgos et al. |
| 2015/0361774 A1 | 12/2015 | Flores |
| 2017/0002623 A1* | 1/2017 | Lecerf ................... E21B 33/138 |
| 2018/0094514 A1* | 4/2018 | Leem ...................... E21B 43/26 |

OTHER PUBLICATIONS

Howell, W. D., and T. J. Clare. "Case History—Explosive Fracturing for Well Stimulation." Drilling and Production Practice. American Petroleum Institute, 1970, 5 pages.

LaRocca, S.J., and A. M. Spencer. "Chemical Explosive Fracturing of Devonian Shale Gas Wells." UGR File #181, Petroleum Technology Corporation, Jun. 1978, 11 pages.

\* cited by examiner

UTILIZING ELECTRICALLY ACTUATED EXPLOSIVES DOWNHOLE

CROSS-REFERENCE TO RELATED APPLICATION

The present application is a U.S. National Stage Application of International Application No. PCT/US2016/047825 filed Aug. 19, 2016, which is incorporated herein by reference in its entirety for all purposes.

BACKGROUND

The present disclosure relates generally to systems and methods for servicing a wellbore, for example, utilizing electrically actuated explosives downhole and, more particularly (but not exclusively), utilizing electrically actuated explosives to induce perforations downhole, plug and abandon a wellbore or both.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation.

Hydraulic fracturing (or "fracking") may be used to stimulate the production of hydrocarbons from subterranean formations penetrated by a wellbore. A fluid may be pumped through the wellbore and injected into a zone of a subterranean formation to be stimulated at a rate and pressure such that fractures are formed and extended into the subterranean formation. Proppant may be positioned in the fractures with the fluid to help prevent the fracture from completely closing. The proppant is then left in the fracture while the fluid is removed. The proppant may hold the fracture open to create a path for fluids from a reservoir in the zone of the subterranean formation (for example, oil, gas, water, etc.) to flow and be recovered from the wellbore. Proppants are selected based one or more characteristics to provide the best flow path for the fluids. For example, the proppant may have a sufficient strength such that the proppant can hold the fracture open without being crushed. Sand is often selected as a proppant as it is economical and readily available, but other proppants, such as walnut shells, ceramics, glass, bauxite, steel or iron balls, crushed iron ore or slage, have been used for many operations. Unusual solids, such as acid based solids, may also be used to help open a fracture and control fluid flow placement. After an operation, the acid based solids will convert into an acid. The fluid flow path may also be created chemically by using an acid as the fracturing fluid and proppant. In this approach, acids may maintain the opening of one or more fissures caused by the fracturing by etching the surfaces of fissures in a formation unevenly, thus creating large channels when the fissures close. While well stimulation by hydraulic fracturing has been successful, it can be expensive because of the various and complex equipment required to generate the relatively enormous downhole hydraulic pressures, which may exceed 10,000 pounds per square inch (p.s.i.). In addition, hydraulic fracturing can be a relatively lengthy process to undertake.

Fracturing may involve placing an explosive charge downhole and detonating the explosive charge to shatter a formation and thereby permit hydrocarbons to flow through the formation to the well. In general, explosive fracturing involves using pure nitroglycerin which is a volatile, dangerous and sensitive explosive. In some operations, explosive fracturing techniques involve using explosive liquids which are pumped into the pores of the formation and are thereafter detonated. Explosive fluids may also include mixtures of oxygen and fuel, or other unstable chemical mixtures as well. These explosive liquids may be sensitive to shock, static electricity, heat or other elements. Further, these explosive liquids may be expensive and may be prone to safety issues.

Whatever the type of materials used in the fracturing process, it may be necessary to determine one or more characteristics of the fracture to identify the effectiveness of the fracture and treatment parameters for future fracturing operations. Many times, wells are cased, for example constructed using a large strong steel pipe able to support the well and prevent the well from collapsing. To dispose the fracturing fluid in the formation, the wellbore steel wall must be perforated before a fracture may be created in the formation.

Not only are fractures beneficial for extracting hydrocarbons from a formation, but also perforations in a formation adjacent to a wellbore may aid in well repair and even the plug and abandonment process of a well. In well repair, perforations may be placed near the areas where the suspected leaks are detected. In well abandonment perforations or slots may need to be created at intervals along the wellbore where competent rock exists. In either well repair or plug and abandonment, a fine cement slurry may be squeezed into each slot at each interval so as to create a cement plug that is in contact with the competent rock. This creates a barrier between a downhole substance and the surface. For example, such plugging or squeezing prevents potentially polluting substances from reaching the surface or other area.

DETAILED DESCRIPTION

Figure 1:
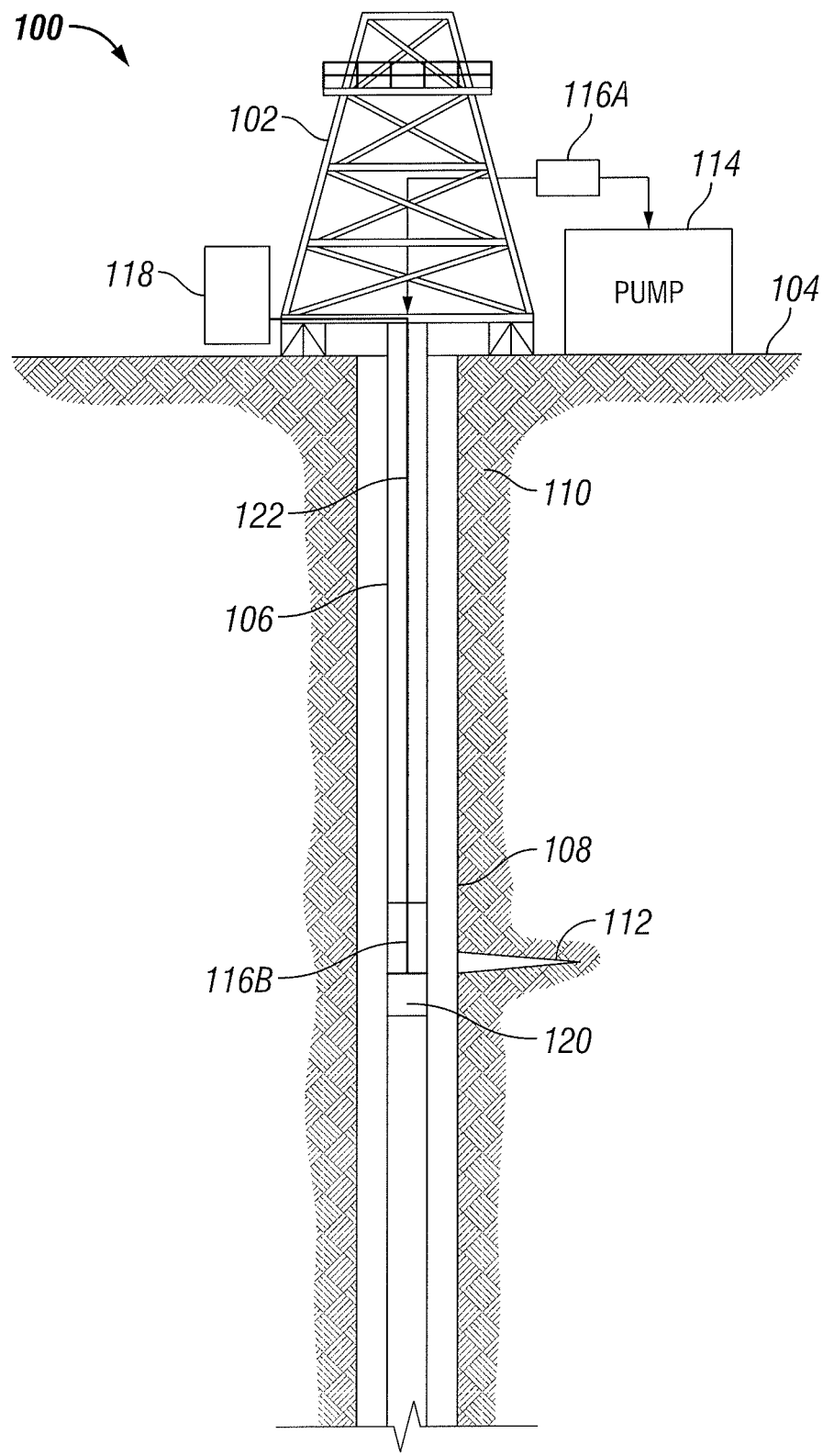
FIG. 1 is a cross-sectional schematic diagram depicting an example of a wellbore environment for utilization of a charge carrier downhole, according to one aspect of the present disclosure.

Certain aspects and examples of the present disclosure relate to using digital propulsion methods to perforate and fracture stimulate a subterranean formation adjacent to a wellbore. An electrically actuated, excited or ignited charge carrier, for example, a perforating gun, may be utilized to create the necessary or intended perforations and fractures, well repair, to plug and abandon a wellbore or any combination thereof. Actuated, excited or ignited may be used interchangeably herein. Because the charge carrier comprises electrically actuated explosive material, the charge carrier has greater stability than traditional explosives used downhole. The electrically actuated, excited, or ignited explosive material is designed not to ignite due to percussive energy, vibrations, radio waves, flames, or any other non-electrical energy. As a result, unintended explosions are reduced and the health and safety of individuals is safeguarded. Also, more control may be exerted over the type of perforations or fractures and the time intervals associated with the creation of such perforations or fractures. The effect of the explosion may be maximized while minimizing damage by controlling the electric excitation of the electrically actuated explosive material. The electrically actuated explosive material may be reignited multiple times until the explosive material is depleted. Multiple holes or slots may be created in the formation by electrically actuating multiple charge carriers or electrically actuating the same charge carrier multiple times. The electrically actuated charge carrier may be deployed in a wellbore during fracturing, during plug and abandonment or both.

The electrically actuated explosive material within a charge carrier may be the material provided by Digital Solid State Propulsion, Inc. or discussed in U.S. Pat. Nos. 7,958, 823, 8,464,640, 8,617,327, 8,888,935, U.S. patent application Ser. Nos. 10/136,786 and 10/423,072 or any other similar material. The electrically actuated explosive material may be a liquid or solid or any combination thereof.

The charge carrier may be injected into the wellbore during any suitable downhole operation. For example, in one embodiment the charge carrier may be deployed downhole to facilitate a fracturing operation such as to create a fracture into a subterranean formation adjacent to the wellbore. The charge carrier may include a shaped charge configured to explode, or otherwise ignite, in response to an electrical signal. In one or more embodiments, the charge carrier may be deployed downhole for stimulating a hydrocarbon-producing formation, during a plug and abandonment process to aid in filling any openings into the formation, wellbore repair, or for any other suitable operation.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure. The various figures described below depict examples of implementations for the present disclosure, but should not be used to limit the present disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (for example, a hard disk drive or floppy disk drive), a sequential access storage device (for example, a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

Throughout this disclosure, a reference numeral followed by an alphabetical character refers to a specific instance of an element and the reference numeral alone refers to the element generically or collectively. Thus, as an example (not shown in the drawings), widget "1A" refers to an instance of a widget class, which may be referred to collectively as widgets "1" and any one of which may be referred to generically as a widget "1". In the figures and the description, like numerals are intended to represent like elements.

To facilitate a better understanding of the present disclosure, the following examples of certain embodiments are given. In no way should the following examples be read to limit, or define, the scope of the disclosure.

Various aspects of the present disclosure may be implemented in various environments. For example, FIG. 1 is a cross-sectional schematic diagram depicting an example of a wellbore environment 100 for deploying a charge carrier downhole, according to one aspect of the present disclosure. The wellbore environment 100 includes a derrick 102 positioned at a surface 104. The derrick 102 may support components of the wellbore environment 100, including a tubing string 106. The tubing string 106 may include segmented pipes that extend below the surface 104 and into a wellbore 108. The wellbore 108 may extend through subterranean formations 110 in the earth adjacent to the wellbore 108. The subterranean formations 110 may include a perforation, an opening or a fracture 112, referred to generally herein as fracture 112. In some aspects, the fracture 112 may be a separation of the subterranean formations 110 forming a fissure or crevice in the subterranean formations 110. In additional aspects, the fracture 112 may be created by a fracturing process in which highly pressured gas is forced into the formations 110. A pump 114 is positioned at the surface 104 proximate to the wellbore 108 to pump a fluid into the wellbore. The fluid may be pumped into the wellbore at a rate to expand the fracture 112 or to fill a perforation or fracture 112. The fracture 112 may serve as a path for the production of hydrocarbons from subterranean reservoirs. A slow-injection pumping device 116 may be included to inject additional fluid into the fracture 112 to further open or extend the fracture 112 in the subterranean formation 110. In one or more aspects, the slow-injection pumping device 116 may be positioned at the surface as depicted by block 116A in FIG. 1. In alternative aspects, the slow-injection pumping device 116 may be positioned on the tubing string 106 as depicted by block 116B. Proppant and other additives may be added to the fluid during or prior to the fluid traversing the pump 114. The proppant may remain in the fracture 112 after the fracturing process is completed to keep the fracture 112 from completely closing. Although the slow-injection pumping device 116 is shown as positioned on a tubing string 106 downhole in the wellbore 108, all, or a portion of, the slow-injection pumping device 116 may be positioned on the surface 104. For example, the slow-injection pumping device 116 may be positioned on the surface 104 downstream of the pump 114.

A charge carrier (or detonation section) 120 may also be positioned or deployed downhole. In one or more embodiments, charge carrier 120 may be positioned along, included with or coupled to the tubing string 106, a bottom-hole assembly, or any other suitable downhole deployment device or tool. Charge carrier 120 may comprise an electrically actuatable or ignitable and electrically controllable explosive material (EIECEM).

An EIECEM may comprise any suitable electrically ignitable propellant or explosive. An EIECEM may comprise an ionomer oxidizer polymer binder, an oxidizer mix including at least one oxidizer salt and at least one eutectic material. For example, an ionomer oxidizer binder may be polyvinylammonium nitrate, the oxidizer salt may be ammonium nitrate, and the eutectic additive may comprise a variety of salts or mixtures thereof, and preferably may comprise an energetic material such as ethanolamine nitrate, ethylene diamine dinitrate, or other alkylamine or alkoxylamine nitrate, or any other suitable mixture or admixtures thereof. Other suitable electrically ignitable propellant may comprise a heat-treated copolymer of polyvinylalcohol (PVA)/polyvinylamine PVAN) binder, a hydroxylamine nitrate based oxidizer, a 5-aminotetrazole stabilizer, and a dipyridyl complexing agent. Boric acid may be used as a crosslinking agent and may be dissolved in the mixture to thus crosslink the heat-treated PVA/PVAN copolymer. The heat-treated mixture may be cooled and then cured by a heat treatment. The EIECEM is electrically controllable such that the EIECEM is only explosive during actuation or inducement from an electrical source, such as inducement or excitement of an electrical charge, electrical current or electrical signal. For example, an explosion is created for a duration of the electrical charge, electrical current or electrical signal at the EIECEM.

Figure 6A:
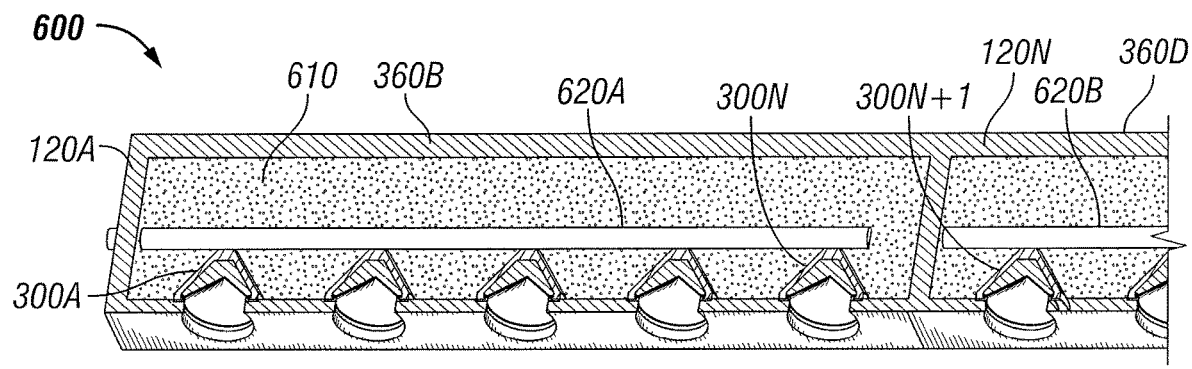
FIG. 6A is a diagram illustrating an example container, according to aspects of the present disclosure.

Charge carrier 120 may be coupled via an electrical connection 122 to a control unit 118 at the surface 104. In one or more embodiments, control unit 118 may be positioned downhole or remote from the wellbore environment 100. An electrical charge or electrical current may be induced by the control unit 118 and transmitted as an electrical signal to the charge carrier 120 to actuate the EIECEM. The control unit 118 may be electrically coupled to the charge carrier 120 via a detonator cable, a single line or wire, a plurality of lines or wires, or any other suitable coupling. The electrical coupling may be any material suitable for conveying an electrical signal. The control unit 118 may pulse electrical signals or send a constant electrical signal to the charge carrier 120 via electrical connection 122. In one or more embodiments, electrical connection 122 may be a wireline, one or more cables, or any other suitable conductive wire or connection. Short electrical pulses may result in small explosions by the charge carrier 120 as compared to longer sustained electrical pulses. Applying short electrical pulses allows for relocation or reorientation of the charge carrier 120. In one or more embodiments, the duration of short electrical pulses may range from less than about 0.01 seconds or may be range from about 0.000001 to about 0.01 seconds, or from about 0.000002 to about 0.009 seconds or from about 0.000005 to about 0.005 seconds, or any other suitable duration for a given operation. While only one charge carrier 120 is shown, any number of charge carriers 120 (or containers 600 as illustrated in FIG. 6A) may be positioned within the wellbore 108.

Figure 2:
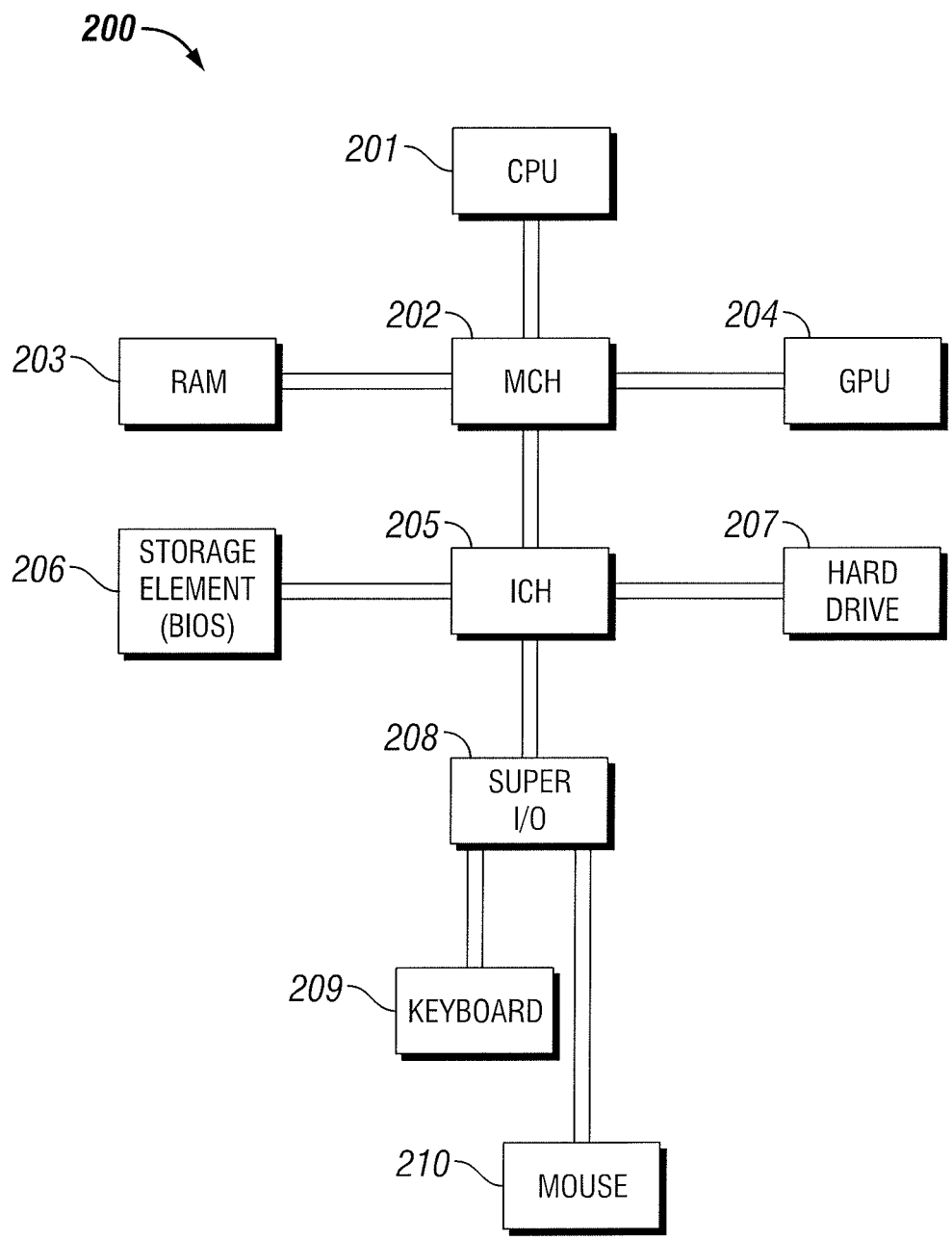
FIG. 2 is a diagram illustrating an example information handling system, according to aspects of the present disclosure.

FIG. 2 is a diagram illustrating an example information handling system 200, according to aspects of the present disclosure. The system control unit 104 may take a form similar to the information handling system 200. A processor or central processing unit (CPU) 201 of the information handling system 200 is communicatively coupled to a memory controller hub or north bridge 202. The processor 201 may include, for example a microprocessor, microcontroller, digital signal processor (DSP), application specific integrated circuit (ASIC), or any other digital or analog circuitry configured to interpret and/or execute program instructions and/or process data. Processor 201 may be configured to interpret and/or execute program instructions or other data retrieved and stored in any memory such as memory 203 or hard drive 207. Program instructions or other data may constitute portions of a software or application for carrying out one or more methods described herein. Memory 203 may include read-only memory (ROM), random access memory (RAM), solid state memory, or disk-based memory. Each memory module may include any system, device or apparatus configured to retain program instructions and/or data for a period of time (for example, computer-readable non-transitory media). For example, instructions from a software or application may be retrieved and stored in memory 203 for execution by processor 201.

Modifications, additions, or omissions may be made to FIG. 2 without departing from the scope of the present disclosure. For example, FIG. 2 shows a particular configuration of components of information handling system 200. However, any suitable configurations of components may be used. For example, components of information handling system 200 may be implemented either as physical or logical components. Furthermore, in some embodiments, functionality associated with components of information handling system 200 may be implemented in special purpose circuits or components. In other embodiments, functionality associated with components of information handling system 200 may be implemented in configurable general purpose circuit or components. For example, components of information handling system 200 may be implemented by configured computer program instructions.

Memory controller hub 202 may include a memory controller for directing information to or from various system memory components within the information handling system 200, such as memory 203, storage element 206, and hard drive 207. The memory controller hub 202 may be coupled to memory 203 and a graphics processing unit 204. Memory controller hub 202 may also be coupled to an I/O controller hub or south bridge 205. I/O hub 205 is coupled to storage elements of the information handling system 200, including a storage element 206, which may comprise a flash ROM that includes a basic input/output system (BIOS) of the computer system. I/O hub 205 is also coupled to the hard drive 207 of the information handling system 200. I/O hub 205 may also be coupled to a Super I/O chip 208, which is itself coupled to several of the I/O ports of the computer system, including keyboard 209 and mouse 210.

Figure 3A:
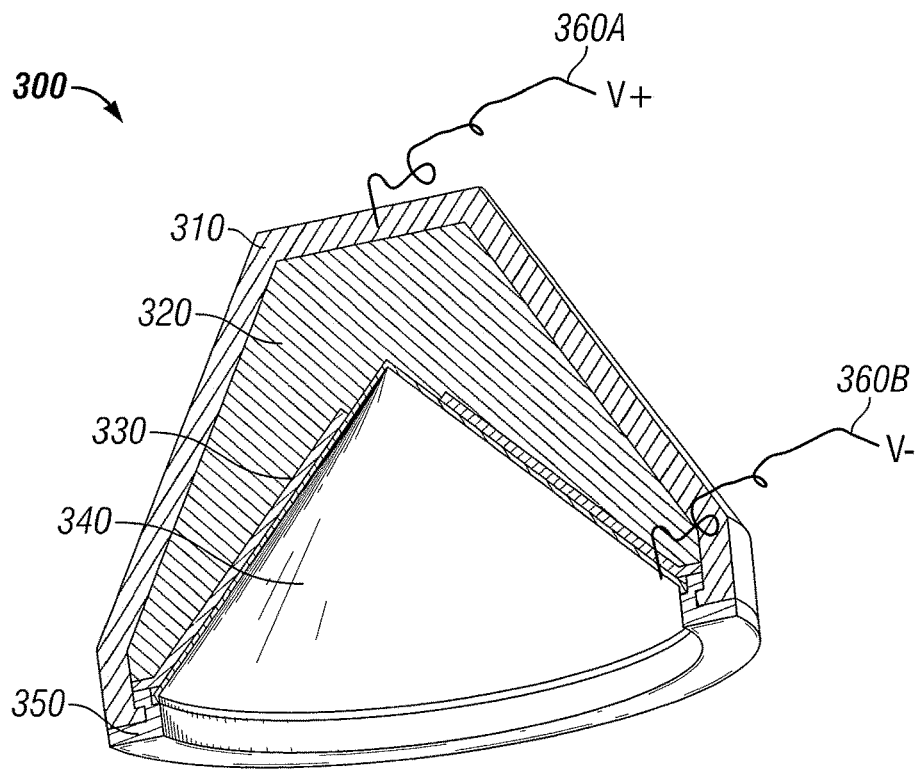
FIG. 3A is a diagram illustrating an example shaped charge, according to aspects of the present disclosure.
Figure 3B:
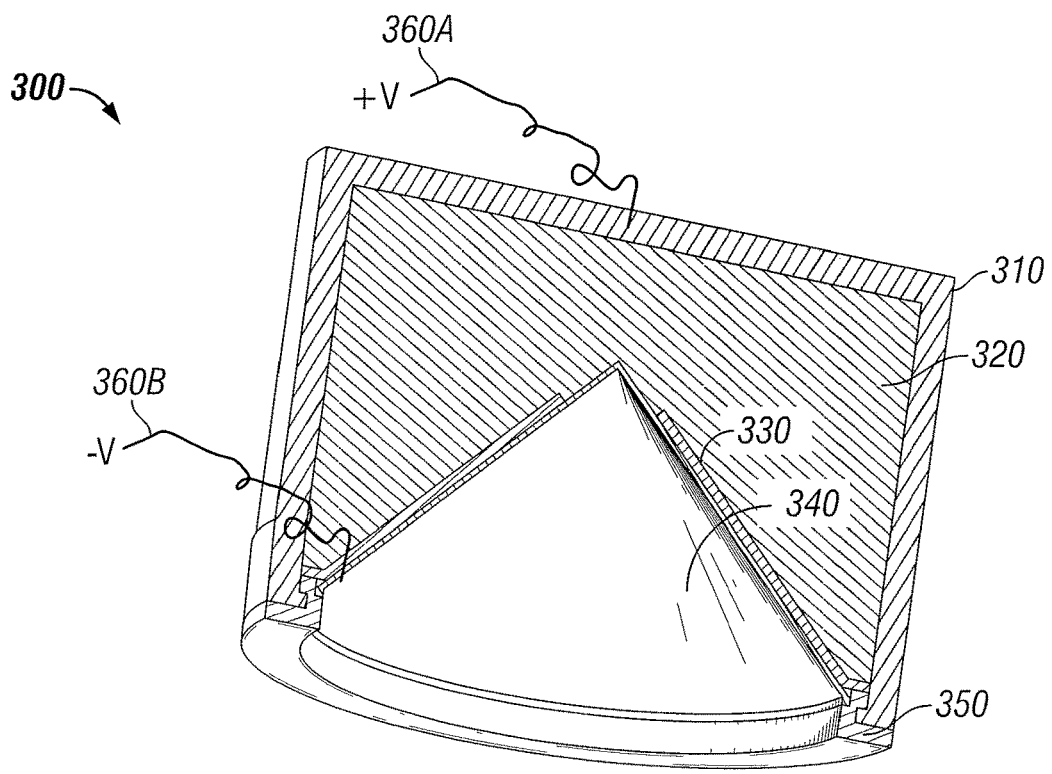
FIG. 3B is a diagram illustrating an example shaped charge, according to aspects of the present disclosure.

FIG. 3A is a diagram illustrating an example shaped charge, according to aspects of the present disclosure. A shaped charge 300 may be in a shape, as illustrated in FIG. 3A, that conforms to positioning within a conventional charge carrier 120 such as a conventional perforating gun. In one or more embodiments, the shaped charge 300 may be in any suitable shape as required by a specific operation or as required by a deployment device, such as charge carrier 120. In one or more embodiments, the shaped charge 300 may be in a shape as illustrated in FIG. 3A, resemble more of a ball shape, or be in a shape suitable for a given operation. For example, the shaped charge 300 may be in more of a rectangular shape as illustrated in FIG. 3B. The shaped charge 300 may comprise a shell 310, an EIECEM 320, an inner insulator 330, a cone 340, a bottom insulator 350, and source contacts 360A and 360B.

While shaped object 340 is illustrated as a cone shape, the present disclosure contemplates that shaped object 340 may be of any suitable shape or size. The shaped object 340 is coupled to the shell 310 via a bottom insulator 350. The bottom insulator 350 may be a ceramic insulator or any other type of insulator that electrically isolates the shaped object 340 from the shell 310. The bottom insulator 350 and the shell 310 may be coupled using any suitable technique including, but not limited to, a molding process, clamps, adhesives, other techniques, or any combination thereof.

The shell 310 may comprise a material that permits an electrical current to be transmitted to the EIECEM 320. For example, an electrode 360A may be coupled to the shell 310 and another electrode 360B may be coupled to the shaped object 340 such that an electrical current may be induced or that the electrodes 360 may be energized so as to initiate combustion or an explosion of the EIECEM 320 for the duration of the electrical current. While FIG. 3A illustrates electrode 360A as a positive terminal and electrode 360B as a negative terminal, the present disclosure contemplates any suitable arrangement of electrodes 360. For example, in one or more embodiments, a plurality of positive and negative electrodes 360 may be coupled to the shaped charge 300. Electrodes 360 may comprise electrode rods, electrode wires, flat plat electrodes or any other suitable electrodes. In one or more embodiments, electrodes 360 may be of any suitable material including, but not limited to, aluminum (so as to be consumed during combustion of EIECEM 320) or stainless steel (so as not to be consumed by the combustion of EIECEM 320).

The shaped object 340 may be insulated from the EIECEM 320 via an inner insulator 330. Inner insulator 330 may be designed to insulate any portion of the shaped object 340 from the EIECEM 320. For example, as illustrated in FIG. 3A, inner insulator 330 insulates all of the shaped object 340 except for an exposed area at the tip of the shaped object 340. Inner insulator 330 may comprise any suitable material so as to be consumed during combustion of EIECEM 320 including, but not limited to, polytetrafluoroethylene (PTFE) coatings (for example, Teflon™ PTFE) or phenol formaldehyde resin coatings (also known as phenolic coatings). The inner insulator 330 may be of a material that burns away, melts, or is otherwise consumed when an electric current, electrical charge or electrical signal is induced across electrodes 360. For example, when an electric current is induced from electrode 360A to electrode 360B, the EIECEM 320 will burn or explode which pushes through, collapses or deforms the shaped object 340. The inner insulator 330 will burn due to the explosion of the EIECEM 320 exposing more of the shaped object 340. As the shaped object 340 is collapsed, pushed or deformed pressurized gas is forced from the charge carrier 300 into the formation 108 to form a perforation or fracture 112. In one or more embodiments, the charge carrier 300 may be configured to direct the pressurized gas in a direction transverse to the longitudinal axis of the charge carrier 300.

In one or more embodiments, the induced electrical charge, induced electrical current, or induced electrical signal is constant such that a single explosion of the EIECEM 320 occurs similar to the behavior of a conventional gun or perforator. As used throughout the present disclosure, electrical charge, electrical current or electrical signal may refer to herein any signal that is capable of actuating, igniting, exciting or otherwise causing the EIECEM 320 to explode or detonate in all or in part. A constant electrical signal, electrical charge or electrical current may almost instantaneously burn away the insulator 330, exposing the entirety of the EIECEM 320 so that the EIECEM 320 is ignited or actuated as a singular or substantially singular explosion. In contrast, a pulsed electrical signal, electrical charge or electrical current causes several explosions of the EIECEM 320 as the inner insulator 330 is burned off, melted away, or, otherwise consumed from the shaped object 340 which allows more electrical charge or electrical current to flow across or into the EIECEM 320.

When the electrical signal, electrical charge or electrical current is removed, the explosion of the EIECEM 320 stops such that each additional electrical pulse causes an additional explosion of the EIECEM 320. The electrical pulsing will eventually explode the entire EIECEM 320. The electrical pulsing may occur at any timed interval or schedule and for any suitable duration. The explosion, to a certain extent, of the charge carriers 300 may be controlled by the sequence and duration of electrical pulses or induced electrical charge, induced electrical current or induced electrical signals. In conventional single shot systems, a hole opening or perforation from an explosion may be small and possible plugged with debris. In contrast, providing a slower explosion provided by the shaped charge 300 allows the perforation tip of the shaped object 340 to collapse, pushing the gas and debris outward, which is then rapidly pushed back by a second shot. Generally, this results in the base of the hole opening to be larger which is more effective in allowing fractures to extend from the opening.

In one or more embodiments, the electrode 360A is coupled to a busbar (not shown) that electrically connects the electrode 360A to a power source. A busbar may permit multiple shaped charges 300 to be excited such that the EIECEM 320 of each shaped charge 300 is ignited or actuated instantaneously or at substantially the same time. In one or more embodiments, the electrode 360B is coupled to a single wire or line that is coupled to a power source so that the associated shaped charge 300 may be excited independently of any other shaped charges 300 such that the EIECEM associated with each shaped charge 300 is independently ignited. Electrode 360B may be coupled to a common ground (not shown) or to a separate ground. In one or more embodiments, common ground may comprise a tool body such as a bottom-hole assembly or any other downhole tool that may be used to deploy the shaped charge 300. In one or more embodiments, the charge carrier 120 may be deployed or disposed at any location along the wellbore 108 and the shaped charges 300 may be ignited at any one or more locations along the wellbore 108.

Figure 4:
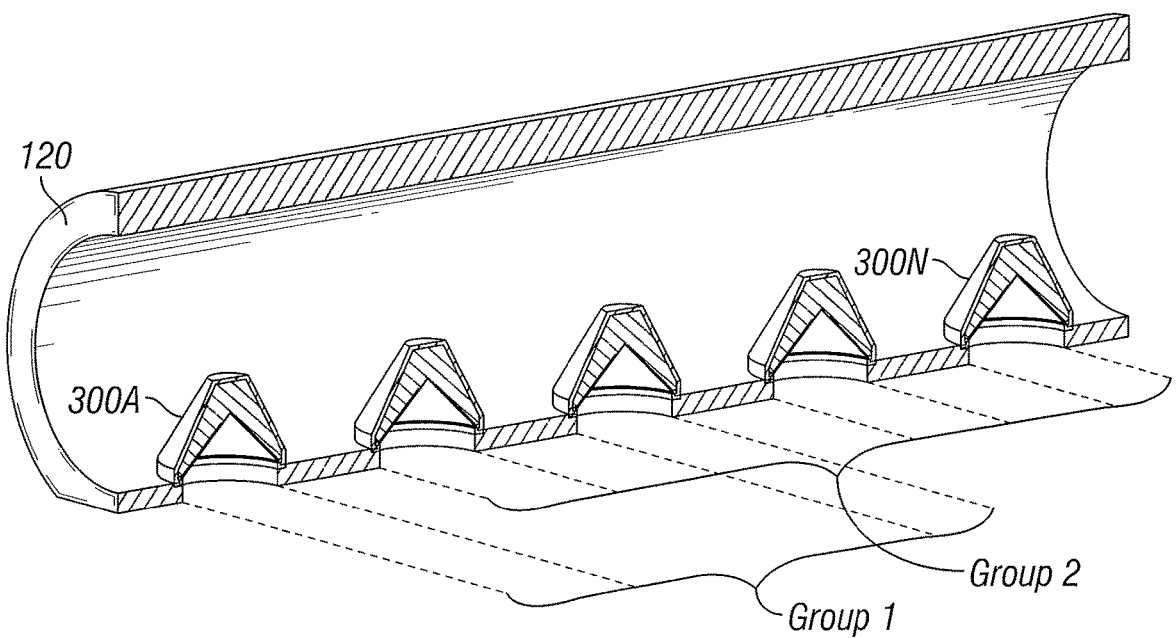
FIG. 4 is a diagram illustrating an example charge carrier, according to aspects of the present disclosure.

FIG. 4 is a diagram illustrating an example charge carrier, according to aspects of the present disclosure. Charge carrier 120 may house or be used to deploy any number of shaped charges 300A-300N, where N represents any number of shaped charges 300. In one or more embodiments, shaped charges 300A-300N may be grouped such that an electrical current or electrical charge is induced across each shaped charge 300 within a group of shaped charges 300. In one or more embodiments, any combination of shaped charges 300A-300N may form any number of groups. For example, in one or more embodiments, shaped charge 300A and 300C may comprise a first group (Group 1) and shaped charges 300B, 300D and 300E may comprise a second group (Group 2). The shaped charges 300 of the first group and the second group may be ignited simultaneously, within a specified time interval of each other, independently of each other, or any other suitable combination or timed interval. The shaped charges 300 may be spaced at any distance apart longitudinally, radially, or azimuthally along or about the charge carrier 120.

In one or more embodiments, each electrode 360A, 360B or any combination thereof associated with shaped charges 300 of a group may be coupled to the same source or wire. For example, each shaped charge 300 in all groups may be coupled to the same ground (for example, 360B) while each positive electrode 360A of each shaped charge 300 may be coupled to a source that is associated with a particular group such that each group may be controlled independently of any other group. For example, Group 1 shaped charges 300 may be coupled by a common first wire that carries a first electrical charge, electrical current or electrical signal while Group 2 shaped charges 300 may be coupled by a common second wire that carries a second electrical charge, electrical current or electrical signal.

In one or more embodiments, the shaped charges 300 may be coupled to a multiplexer or switch that permits excitation of a specific shaped charge 300 or group of shaped charges 300. For example, a computing device or information handling system such as a control unit 118 may comprise or be coupled to a multiplexer and the multiplexer may be coupled to the electrodes 360A of each of the shaped charges 300 within a charge carrier 120. The control unit 118 may send a signal to the multiplexer selecting a specific or particular one or more shaped charges 300 for excitation. In one or more embodiments, any other device or mechanism may be utilized to select or activate (for example, actuate) any one or more shaped charges 300. In one or more embodiments, the control unit 118 may comprise a power source that provides an electrical charge, electrical current or electrical signal to electrodes 360A. In one or more embodiments, a power source may be provided downhole and activated by a control unit 118 where control unit 118 may be located at the surface 104, remotely, or within the wellbore 108.

Figure 5:
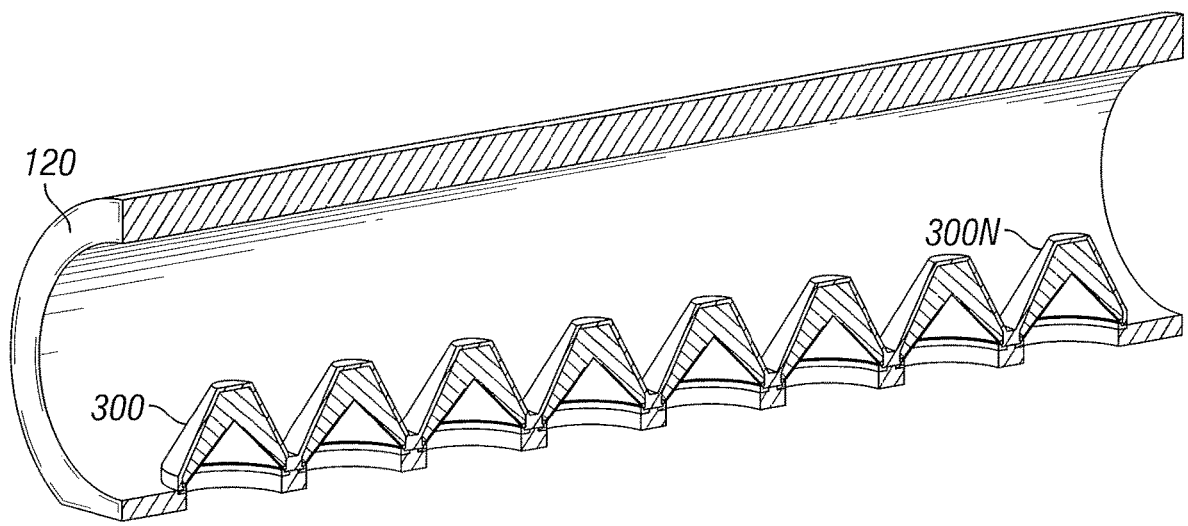
FIG. 5 is a diagram illustrating an example charge carrier, according to aspects of the present disclosure.

FIG. 5 is a diagram illustrating an example charge carrier, according to aspects of the present disclosure. Charge carrier 120 may comprise any number of shaped charges 300 indicated as 300A-300N, where N is any number of shaped charges 300. The configuration of shaped charges 300 in FIG. 5 may explode forcing pressurized gas into formation 110 such that a perforation or fracture 112 within formation 110 is shaped or formed as a slot. The shaped charges 300 of FIG. 5 may be actuated at or near the same time or at any suitable interval.

FIG. 6A is a diagram illustrating an example container, according to aspects of the present disclosure. A charge carrier 120 may also comprise a container 600 or be disposed within a container 600 as illustrated in FIG. 6A. Container 600 may comprise any number of charge carriers 120A through 120N and similarly each charge carrier 120 may comprise any number of shaped charges 300A through 300N, where N represents any suitable number. A busbar 620 may be a source for an electrical charge, electrical current or electrical signal for each of the shaped charges 300. In one or more embodiments, busbar 620 may couple to each electrode 360A of each shaped charge 300. In one or more embodiments, the busbar 620 may be the electrode 360A. The container 600 or each charge carrier 120 may act as a ground or as electrode 360B for each of the shaped charges 300. In one or more embodiments, busbar 620 may comprise one or more wires, lines or any other material capable of conveying or transmitting an electrical charge, electrical current, or electrical signal such that each shaped charge 300 may be coupled to an associated wire or any group of shaped charges 300 may be coupled to a common wire.

In one or more embodiments, the container 600 may be used as a carrier for shaped charges 300. In one or more embodiments, an electrically sensitive or ignitable and electrically controllable explosive material (EIECEM) 610, similar to or the same as EIECEM 320, may be disposed within the interior of container 600 in addition to the shaped charges 300. The busbar 620 acts as a conductor and may be electrically isolated from the container 600 so as not to form a short circuit as the container 600 acts as a ground for electrodes 360B. Excitation of the busbar 620 induces an electrical charge, an electrical current or an electrical signal to flow from the busbar 620 through the EIECEM 610 to the ground 360B causing an explosion of the EIECEM 610 and also causing an explosion of the EIECEM 320 of the shaped charges 300. Such a design is especially effective for wellbore environments 100 where a perforation or fracture 112 has already occurred within formation 110. The additional explosion from the EIECEM 610 creates a high pressure pulse that helps initiate a perforating gun (such as a Stim-Gun™) effect; the shaped charges 300 are pushed out of the charge carriers 120 with greater energy. In one or more embodiments, the EIECEM 610 may be actuated or ignited before, after, at the same time as or any combination thereof the shaped charges 300 are actuated or ignited.

In one or more embodiments, container 600 comprises a plurality of charge carriers 120. Charge carrier 120A comprises a first busbar 620A (or conductor or electrode 360A) common to each shaped charge 300 (for example, shaped charges 300A-300N) within the charge carrier 120A. A charge carrier 120N comprises a second busbar 620B (or conductor or electrode 360C) common to each shaped charge 300 within the charge carrier 120N. The busbar 620A may be excited or actuated separately and independently from the busbar 620B. A busbar 620 may be a wireline or any other suitable connection for delivering an electrical charge, electrical current or electrical signal.

Figure 6B:
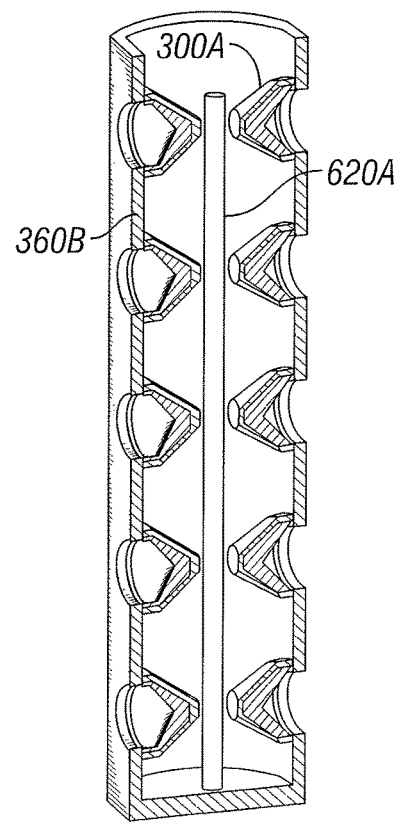
FIG. 6B is a diagram illustrating an example container, according to aspects of the present disclosure.
Figure 6C:
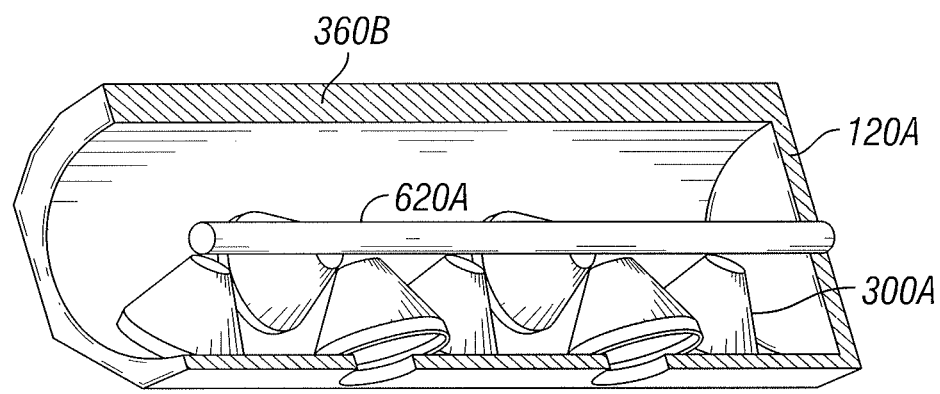
FIG. 6C is a diagram illustrating an example container, according to aspects of the present disclosure.
Figure 6D:
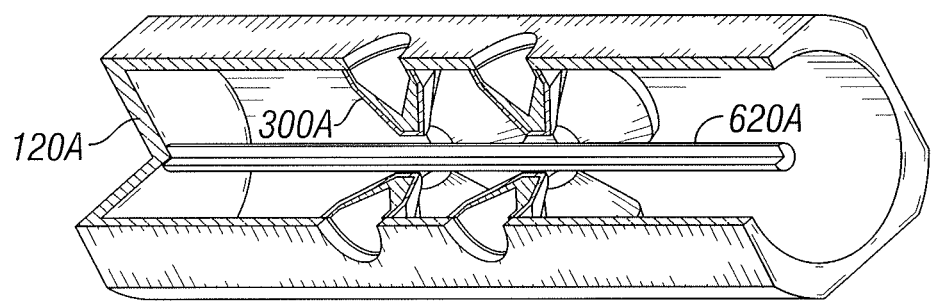
FIG. 6D is a diagram illustrating an example container, according to aspects of the present disclosure.

FIG. 6B is a diagram illustrating an example container, according to aspects of the present disclosure. In operations requiring stimulation of a formation 110, one or more perforators may be placed in any one or more configurations. In an essentially, substantially or mostly vertical wellbore, such as wellbore 108, induced fractures in the formation 110 are aligned longitudinally with the wellbore 108. Most perforators are then aligned in a bi-wing direction. The present disclosure contemplates such a bi-wing configuration as illustrated in FIG. 6B and FIG. 6C. For generally horizontal wells, longitudinal fractures are not effective. A zero-phased tool with 45-degree offsets or a transverse fracture approach may be used for these generally horizontal wells. The present disclosure contemplates such an offset configuration or transverse configuration as illustrated in FIG. 6C and FIG. 6D, respectively. Note that in FIG. 6D phasing is shown to be 90 degrees which is not a popular phasing. A phasing angle of 60 or 120 degrees may be more preferable.

Figure 6E:
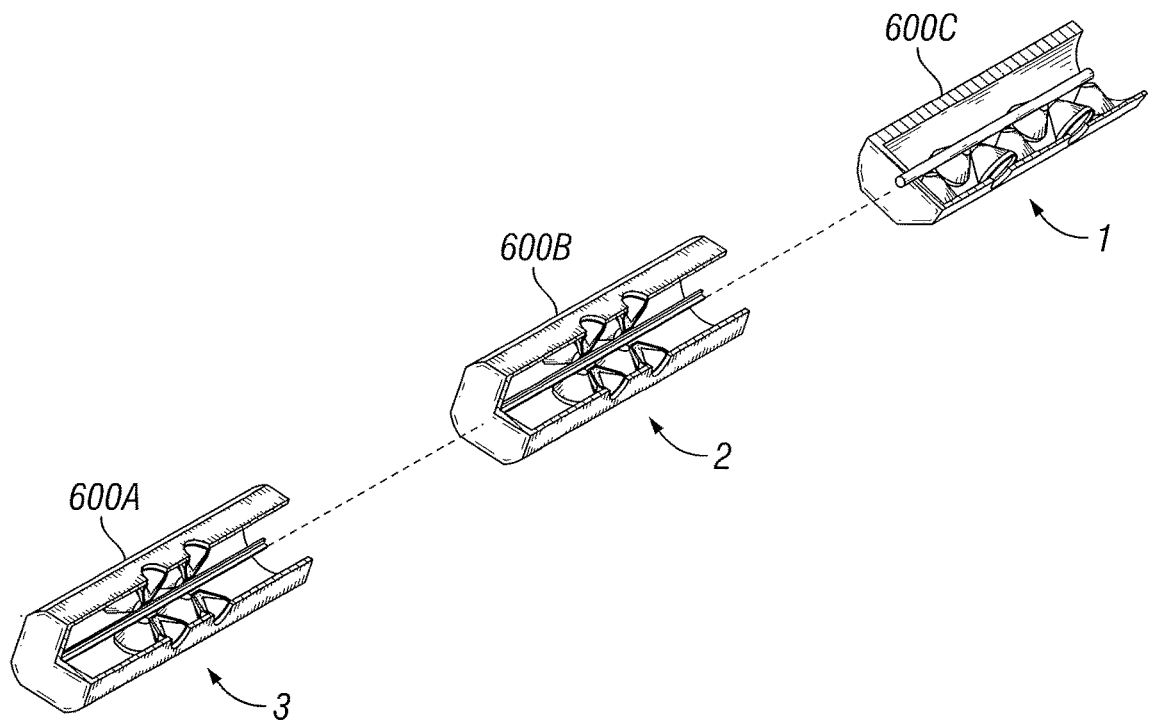
FIG. 6E is a diagram illustrating an example container configuration, according to aspects of the present disclosure.

FIG. 6E is a diagram illustrating an example container configuration according to aspects of the present disclosure. The configuration illustrated in FIG. 6E may be referred to as a Texas-Two-Step approach to hydrajet fracturing. In this illustrated approach, a first container 600A is placed at a first location (1), a second container 600B is placed at a second location (2), and a third container 600(C) is placed at a third location (3). While only three positions and containers 600 are illustrated in FIG. 6E, the present disclosure contemplates any number of locations and containers 600 and any number of containers 600 at any given location. The number of containers 600 may depend on the length of an assembly or downhole tool that may be installed in the wellbore 108 at one instance.

The Texas-Two-Step approach according to aspects of the present disclosure involves hydrajetting and then fracturing by actuating the shaped charge carriers 300 of container 600A at location 1; hydrajetting and then fracturing by actuating the shaped charge carriers 300 of container 600B at location 2; hydrajetting and then fracturing by actuating the shaped charge carriers 300 of container 600C at location 3. Due to the generation of fractures at location 1 and location 2, local stresses have been modified by the previous fracture(s) as describe by the multi-oriented hydraulic fracturing (MOHF) and the resulting fracture or fractures are initiated longitudinally.

In one or more embodiments, the Texas-Two-Step approach illustrated in FIG. 6E is initiated by preparation of the wellbore 108 by circulating or injecting in a fluid, such as a pad fluid. The wellbore 108 is then pressurized until the fracturing pressure is reached. Once the fracturing pressure is reached, the container 600A at location 1 is triggered or the shaped charges 300 are excited or otherwise detonated. The pad fluid will surge into the perforation and create a fracture. This is followed by a fracturing fluid (for example, slurry). The fracturing fluid is then displaced, for example, by the AccessFrac® fluid system which is in turn displaced by the pad fluid. When the fluid used to displace the fracturing fluid arrives at the fracture created by exciting container 600A, a pressure increase is observed or determined and the container 600B at location 2 is triggered. The process continues in a similar manner at which point the container 600C is triggered. In conventional systems using conventional perforators, a turbulent flow going past the downhole fracturing tools might cause a premature explosion causing permanent damage to one or more downhole tools and disturbing the operation. As the present disclosure contemplates using shaped charges 300 which are inert, a premature explosion does not occur.

Figure 6F:
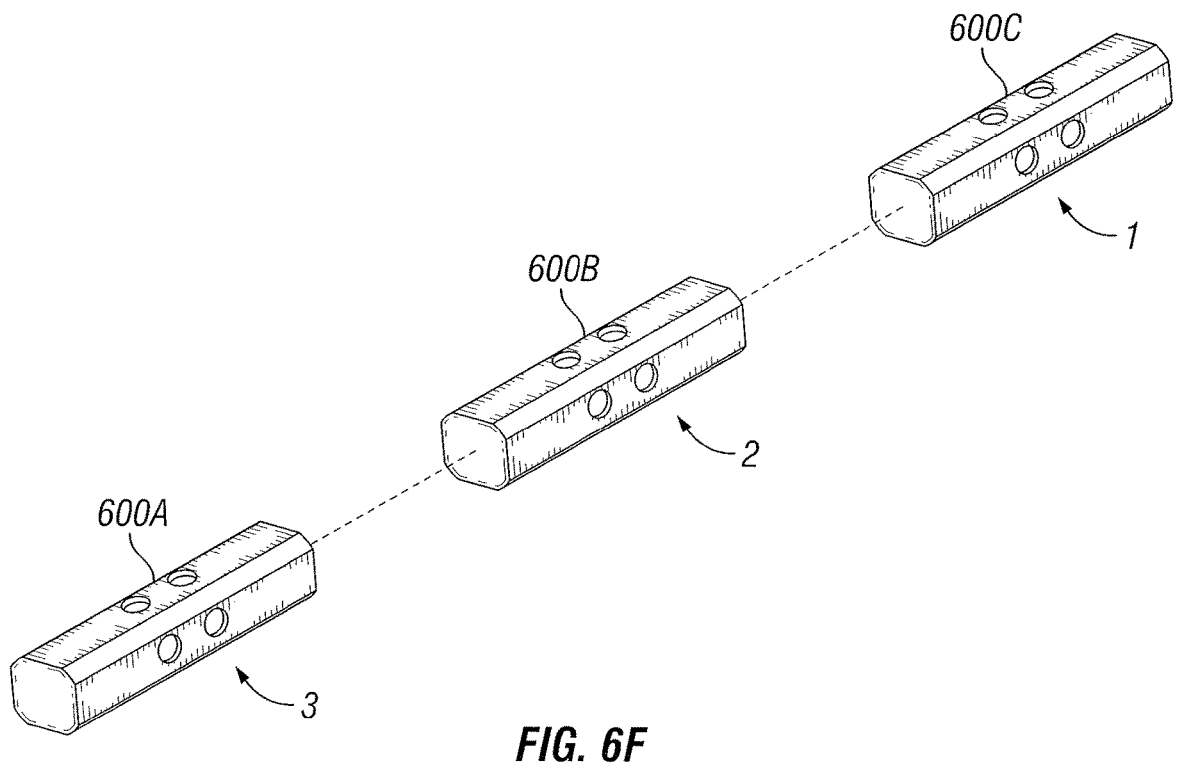
FIG. 6F is a diagram illustrating an example container configuration, according to aspects of the present disclosure.

FIG. 6F is a diagram illustrating an example container configuration according to aspects of the present disclosure. Similar to FIG. 6E, the container 600A is located at a first location (1), container 600B is located at a second location (2), container 600C is located at a third location (3). Each of the containers 600 are configured as a transverse system as illustrated in FIG. 6D. Similar to the Texas-Two-Step above, this just in time perforating and fracturing operates in a similar manner except all of the containers 600 are configured as transverse systems. Perforations are triggered one at a time by triggering each container 600 individually and sequentially. The containers 600 are triggered one at a time starting at container 600A, then container 600B and then container 600C. During this process, pumping may be continuous to expedite stimulation of the wellbore 108.

Figure 7:
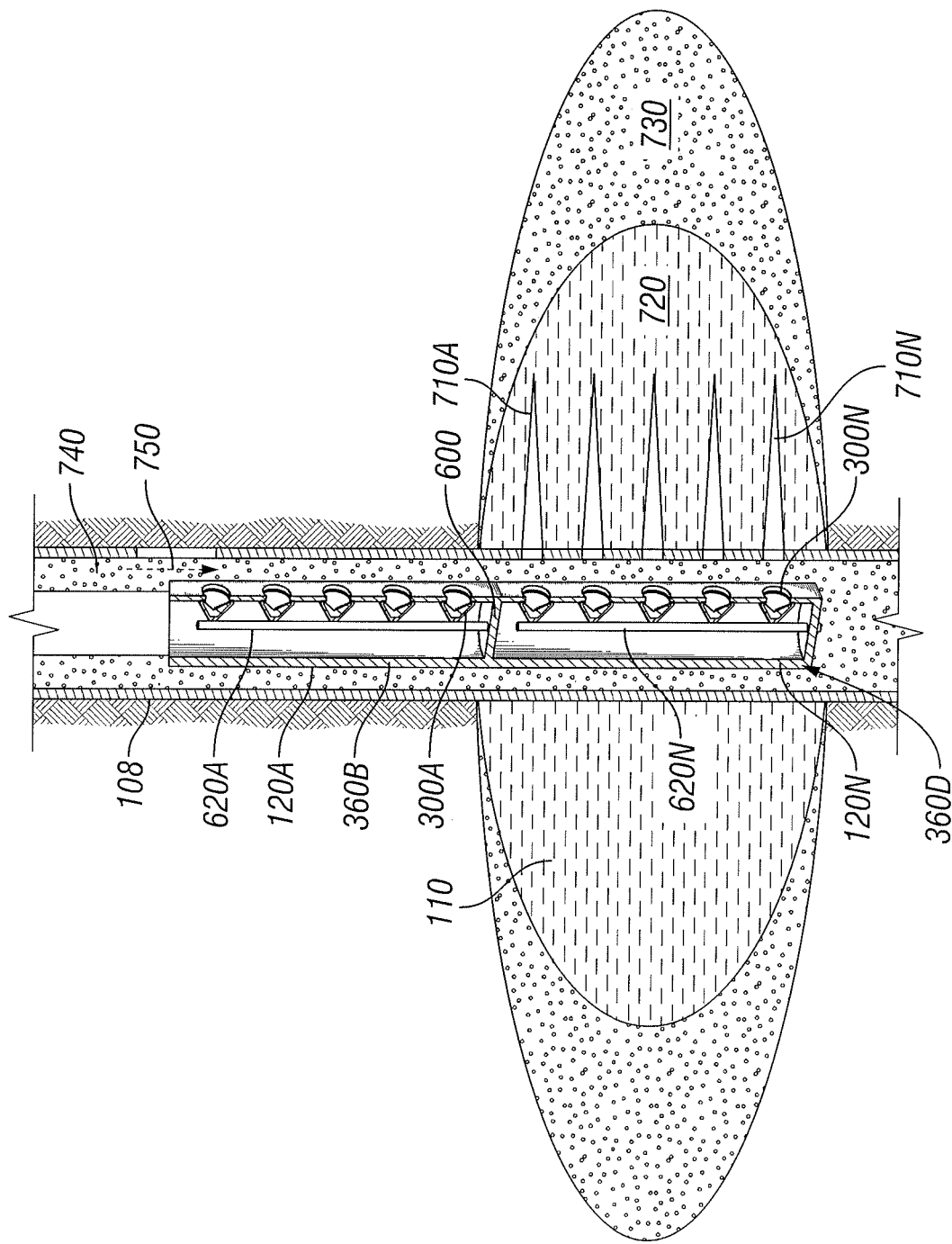
FIG. 7 is a diagram illustrating an example fracture stimulation in a downhole environment, according to aspects of the present disclosure.

FIG. 7 is a diagram illustrating an example fracture stimulation in a downhole environment, according to aspects of the present disclosure. A container 600 may be positioned or deployed within a wellbore 108. In one or more embodiments, container 600 may comprise one or more charge carriers 120A-120N. A fluid 750 may be pumped or injected into the annulus 740. In one or more embodiments, the fluid 750 may be a fracturing fluid. In one or more embodiments, one or more initial perforations or fractures 710A-710N, where N represents any number, may exist in a first formation portion 720 of formation 110. In one or more embodiments, one or more perforations or fractures 710A-710N are induced by actuating one or more shaped charges 300 according to any one or more aspects of the present disclosure. Pumping fluid 750 into the annulus 740 prior to actuating the one or more shaped charges 300 may extend fractures 710 once the shaped charges 300 are actuated. For example, the energy of the fluid 750 moving down along with the explosion from the shaped charges 300 work together to create an extended fracture 710 further into the formation 110, for example, first formation portion 720, second formation portion 730 or both. Any one or more busbars 620A-620N may be actuated or an electrical charge, electrical current or electrical signal induced at any one or more electrodes 360. For example, an electrical charge, electrical current or electrical signal may be induced at busbar 620N of charge carrier 120N. The EIECEM 320 of shaped charges 300 may explode due to the electrical charge, electrical current or electrical signal induced between pairs of electrodes 360 coupled to the shaped charges 300. This explosion combined with the energy of the fluid moving down the annulus 740 causes an expulsion of pressurized gas such that the perforations or fractures 710 are forced to extend from the first formation portion 720 to the second formation portion 730 of formation 110. Oftentimes, the container 600 may comprise EIECEM 610. The container 600 may then be excited or actuated independently of the shaped charges 300 and timed such that the creation or extension of a fracture 710 is maximized. For example, actuating the shaped charges 300 may create or extend a fracture 710 into a first formation portion 720 while a subsequent actuation of the container 600 filled with an EIECEM 610 may extend the fracture 710 into the second formation portion 730.

Figure 8A:
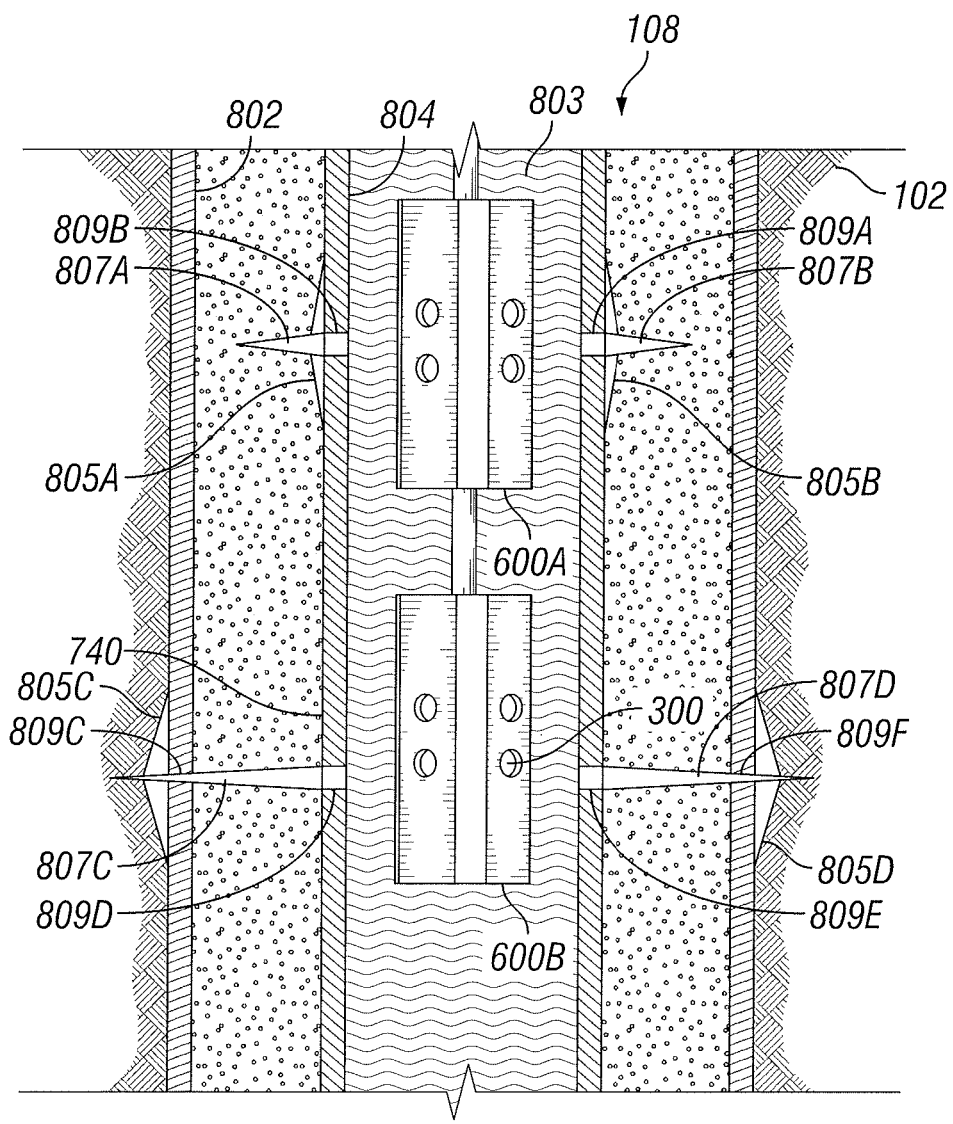
FIG. 8A is a diagram illustrating an example container for a cement squeeze process in a downhole environment, according to aspects of the present disclosure.

FIG. 8A is a diagram illustrating an example container for a cement squeeze process in a downhole environment, according to aspects of the present disclosure. Poor cement quality or earth movements may cause leakages via one or more apertures, cracks or openings 809 (for example, 809A-809D) around a wellbore casing 802 and 804. Unwanted materials, liquid or gas may escape or be released that may pollute the soil or air. One approach to address this issue or hazard is to perforate the casing, for example 802 or 804, and then straddle squeeze cement or other sealing fluid 803 into the annulus 740. When multiple layers of casing 802 and 804 exist, conventional perforators may not be able to perforate to the exterior of the location of the leaks 809. Exciting containers 600 comprising not only shaped charges 300 but also EIECEM 610 may result in much deeper perforations so that a proper, beneficial, environmentally safe, or desired squeeze operation may be achieved.

In one or more embodiments, a container 600A is positioned at a first location within the wellbore 108 where a leak 809A, 809B or both has occurred behind casing 804. As only a single casing 804 need be penetrated, the container 600A may not be filled with EIECEM 610. A single excitation or actuation of the shaped charges 300 may sufficiently create a perforation 807A and a perforation 807B so that a cement 803 may be squeezed into the perforation 807 to create seals 805A and 805B to seal the leak. In one or more embodiments the cement 803 may be a fine cement (for example Micro-Matrix) or a resin (for example, WellLock).

In one or more embodiments, a container 600B is positioned at a second location within the wellbore 108 where a leak 809C, a leak 809D, a leak 809E, a leak 809F or any combination thereof has occurred behind a second casing 802. As two casings must be penetrated, the container 600B may contain EIECEM 610. The container 600B may be oriented differently or offset from container 600A by any number of degrees. The container 600B may be excited or actuated in any manner, for example, any one or more aspects of the present disclosure. For example, the shaped charges 300 of container 600B (for example, as illustrated in FIG. 7) may be actuated one, two or any appropriate number of times so that an initial perforation is made and then the container 600B may be actuated in such a manner as to excite the EIECEM 610 which extends the perforation 807C and the perforation 807D through the outer casing 804. A cement 803 may then be squeezed into the perforations 807C and 807D to create seals 805C and 805D and to prevent any leakage of unwanted or potentially polluted materials.

Figure 8B:
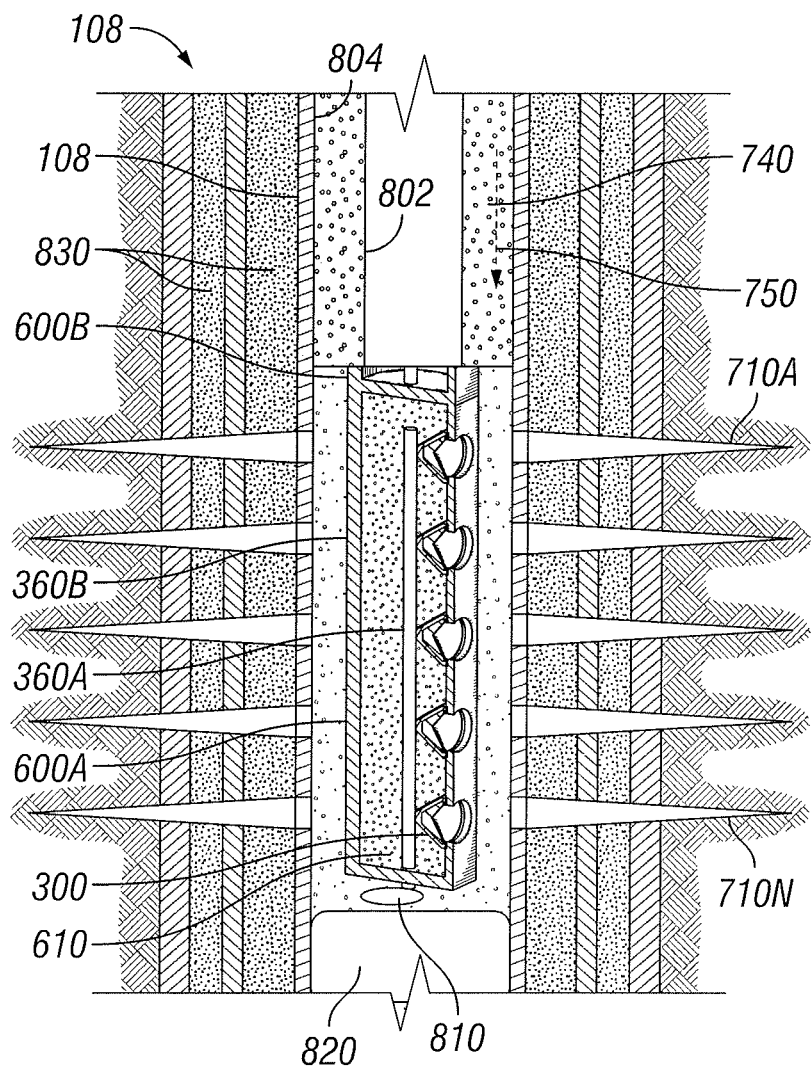
FIG. 8B is a diagram illustrating an example container for a plug and abandonment process in a downhole environment, according to aspects of the present disclosure.

FIG. 8B is a diagram illustrating an example charge carrier for a plug and abandonment process in a downhole environment, according to aspects of the present disclosure. During the life of a well, such as wellbore 108, some repair may be needed. On occasion, the integrity of well may degrade, for example, the well may begin to leak or cement around the well may decay. Hydrocarbons from the well may leak from one formation layer to another. In other instances, the well may simply become unproductive and may be abandoned. In any instance, the well may need to properly plugged to protect the surrounding environment from any potentially polluting or unwanted substances.

Figure 9A:
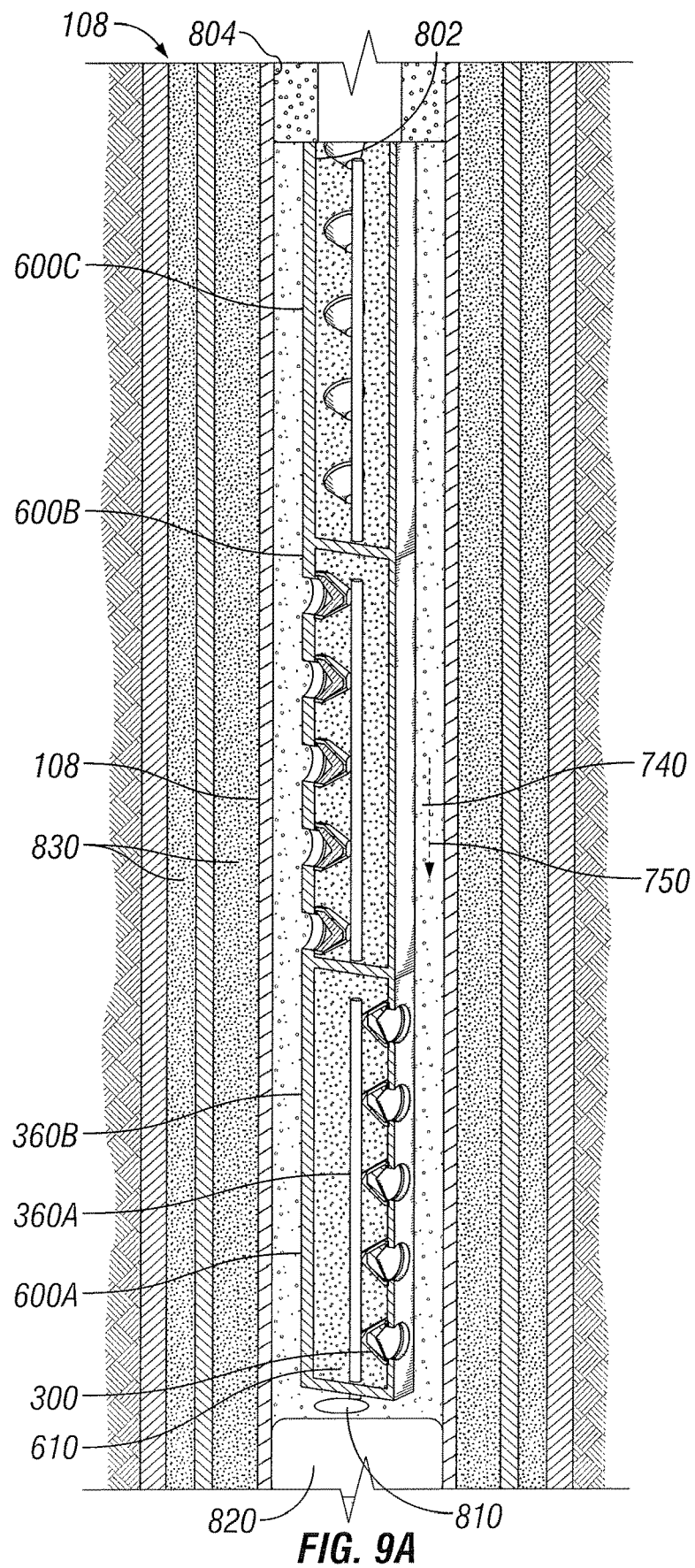
FIG. 9A is a diagram illustrating an example container with a cluster of shaped charges, according to aspects of the present disclosure.
Figure 9B:
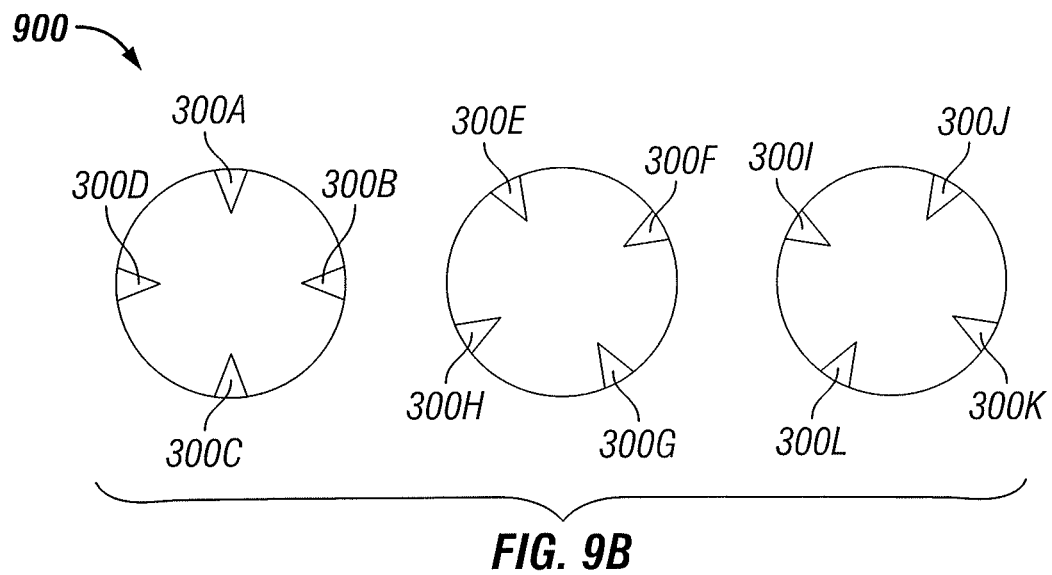
FIG. 9B is a diagram illustrating an example container with a cluster of shaped charges, according to aspects of the present disclosure.

Generally, a plug and abandonment (P&A) process requires a perforation, preferably slot-shaped, to communicate to the formation around a wellbore. A fine cement slurry may then be squeezed into the cavity of the wellbore along with a cement plug. For example, in North Sea Operations, three competent rock layers must be found and cement plugs must be injected with each cement plug completely touching a corresponding competent rock layer. FIG. 8B illustrates a more efficient, simple and safe plug and abandonment process using charge carriers. Note that in the P&A process the preferred density of shaped charges 300 may be higher than other applications or operations. In one or more embodiments for a P&A process, the shaped charges 300 may be placed in clusters, layers or both comprising three, four or more shaped charges 300 as illustrated in FIG. 9A and FIG. 9B. A container 600 may have any number of layers 910 or clusters with each of the layers 910 or clusters rotated five, ten, fifteen or more degrees or any number of degrees. Distance between each layer 910 or cluster may be determined based on one or more criteria for a given operation or process. For example, the distance between each layer 910 or cluster may be six, eight, or twelve inches, meters, feet or any other distance. In one or more embodiments, the distance between each layer 910 or a cluster may be different for any one or more layer 910 or cluster as discussed with respect to FIGS. 9A-9C.

A sealing device 820 may be installed or positioned within wellbore 108. In one or more embodiments, the sealing device 820 may comprise a bridge plug, a packer or any other device that is configured to isolate a section or a portion of the wellbore 108. The sealing device 820 may be installed using a coiled tubing (not shown) or any other suitable deployment mechanism or tool. An explosive 810 is inserted or positioned on top of the sealing device 820. For example, the coiled tubing may be circulated to deposit the explosive 810 on top of or above the sealing device 820. The explosive 810 may be a pill of liquid explosive that is electrically ignitable and electrically controllable, such as EIECEM 310 or EIECEM 610. The explosive 810 may be actuated or excited by the electrode 360A, 360B or by any other electrical source or combination thereof. The explosive 810 may be in contact with, coupled to, disposed about, interface with or otherwise be disposed at or near the sealing device 820. The coiled tubing may be removed or pulled out of the wellbore 108 after deployment of the sealing device 820.

Any number of containers 600 or charge carriers 120 comprising any number of shaped charges 300 may be deployed or positioned within the wellbore 108. In one or more embodiments, one or more containers 600 or charge carriers 120 may form a cluster and one or more clusters may be disposed within the wellbore 108. The container 600 may have 50 clusters of charge carriers 120 with one or two clusters per meter. In one or more embodiments, more or fewer clusters may be deployed with any number of clusters per any depth within the wellbore 108 as required by a specific operation. In one or more embodiments, the shaped charges 300 of charge carriers 120 may be aligned or disposed longitudinally along the charge carriers 120 so as to produce a perforating gun effect where perforations or fractures 710 are made in a linear pattern. In one or more embodiments, a plurality of clusters of charge carriers 120 each comprise a plurality of charge carriers 120 positioned at one or more layers.

For example, FIG. 9A is a diagram illustrating an example container with a cluster of shaped charges. Multiple containers 600 may be disposed within a wellbore 108. As illustrated in FIG. 9A, three containers 600A, 600B and 600C may be disposed within wellbore 108 comprising a first casing 804 and a second casing 802. Containers 600A, 600B and 600C may comprise a cluster of shaped charges 300 as discussed with respect to any one or more embodiments, such as FIG. 6E. For example, any given container 600 may comprise a plurality of shaped charges 300 with the shaped charges 300 within each container 600 offset from each other by any number of degrees, for example, by forty-five degrees as illustrated in FIG. 9B. In FIG. 9B, container 600A comprises shaped charges 300A, 300B, 300C and 300D arranged forty-five degrees apart, container 600B comprises shaped charges 300E, 300F, 300G, 300H arranged forty-five degrees apart and container 600C comprises shaped charges 300J, 300K, 300L and 300I arranged forty-five degrees apart. As illustrated in FIG. 9B, the containers 600 may also be disposed at an offset from each other such that the shaped charges 300 within each container 600 do not align along a longitudinal axis. Containers 600 may comprise any number of shaped charges 300 to form a cluster of shaped charges 300 within a respective container 600. Containers 600 may be disposed a predetermined distance from each other. For example, container 600A may be disposed a first distance from container 600B and container 600B may be disposed a second distance from container 600C. In one or more embodiments, the first distance and the second may be the same distance or a different distance.

Figure 9C:
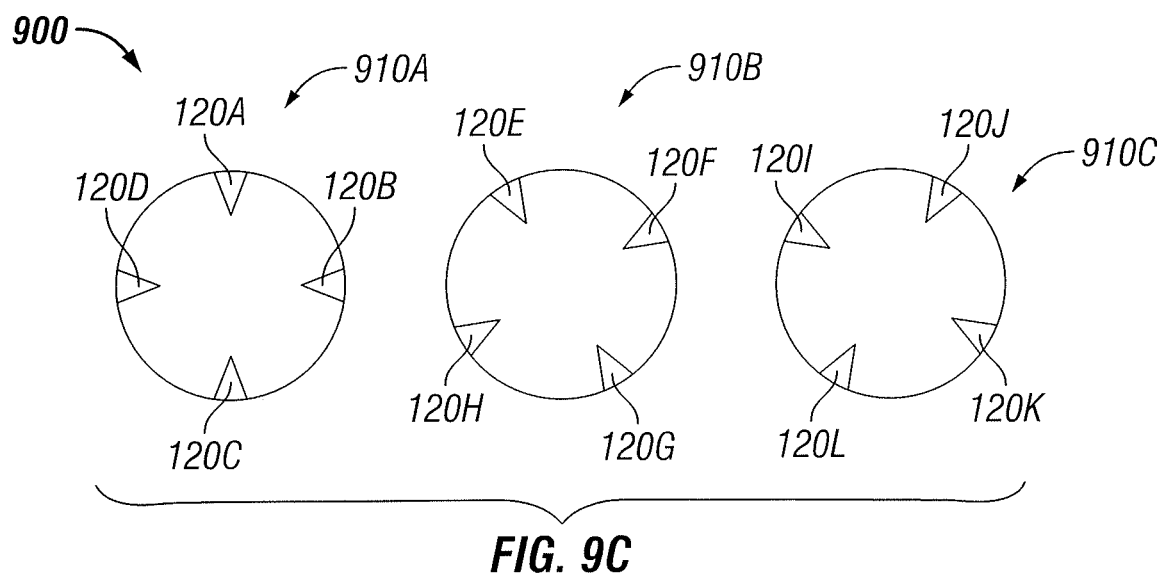
FIG. 9C is a diagram illustrating an example cluster of charge carriers, according to aspects of the present disclosure.

While FIG. 9A and FIG. 9B illustrate containers 600 aligned longitudinally with only a singular container 600 at each horizontal axis, the present disclosure contemplates that any number of containers 600 may form a cluster of containers 600. For example, multiple containers 600 may be clustered in a first layer, a second layer or any number of layers with each container 600 comprising any number of shaped charges 300 arranged in any number of ways and arranged in any number of offsets from each other. While containers 600 are illustrated, the present disclosure contemplates that charge carriers 120 may be interchangeable with containers 600. For example, FIG. 9C illustrates a cluster of charge carriers 120 where within each respective layer 910A, 910B and 910C the charge carriers 300 are offset from each other by forty-five degrees and where layers 910 are offset from each other by thirty-degrees for a total of twelve charge carriers 300 disposed within three layers. The charges carriers 120A, 120B, 120C and 120D may form for a first layer 910A, charge carriers 120E, 120F, 120G and 120H may form a second layer 910B and charge carriers 120I, 120J, 120K and 120L may form a third layer 910C. The charge carriers 120 are aligned forty-five degrees apart within each layer. The present disclosure contemplates that any number of charge carriers 120 may be aligned any number of degrees apart and that the number of degrees apart may vary between each respective charge carrier 120 within a layer 910. A given operation may comprise any number of clusters of charge carriers 300 where each cluster may comprise any number of layers 910 with each layer 910 comprising any number of charge carriers 120. While FIG. 9C illustrates an arrangement of charge carriers 120, the present disclosure contemplates that containers 600 may be used interchangeably with charge carriers 120 according to a specific operation.

Returning to FIG. 8B, in one or more embodiments, the container 600 and the charge carriers 120 may be actuated or excited with an electrical charge, electrical current or electrical signal substantially simultaneously or within a very short time period of each other. In one or more embodiments, the containers 600 may comprise an EIECEM 610 and may be actuated or excited in a predetermined sequence, sequentially or in any other order or manner according to a specific operation. In one or more embodiments the charge carriers 120 may be actuated or excited sequentially or in any other order or manner according to a specific operation.

In one or more embodiments, a first explosion may comprise actuating or exciting substantially simultaneously, sequentially or any combination or order thereof any one more shaped charges 300 of any one or more containers 600 by, for example, electrifying one or more electrodes 360. A second explosion may comprise actuating or exciting an EIECEM 610 of the one or more containers 600 by, for example, electrifying the busbar 620 and grounding the container 600. A third explosion may comprise actuating or exciting an EIECEM 610 between the casing 802 or 804 or both by for example, electrifying the container 600 and using the formation 110 as an electrical ground. An explosion of the explosive 810 burns all casing strings or tubing strings 106 and cement 830. All tools, containers 600 or other downhole devices may be pulled out of the wellbore 108 and a coiled tubing or any other suitable mechanism may be deployed to inject a sealing fluid into the wellbore 108. The sealing fluid will fill in one or more cavities within the wellbore 108, for example, the perforations or fractures 710, and form a bond or be in contact with multiple layers or competent rock so as to seal the wellbore 108 and prevent any potential pollutants or downhole materials, fluids or gases from escaping or interspersing to other areas of the formation 110 or to the surface 104. The sealing fluid may comprise a solidifyable fluid. The solidifyable fluid may comprise one or more of a cement, an elastomer, a polymer, a particulate filled fluid, or any combination or mixture thereof.

Figure 10:
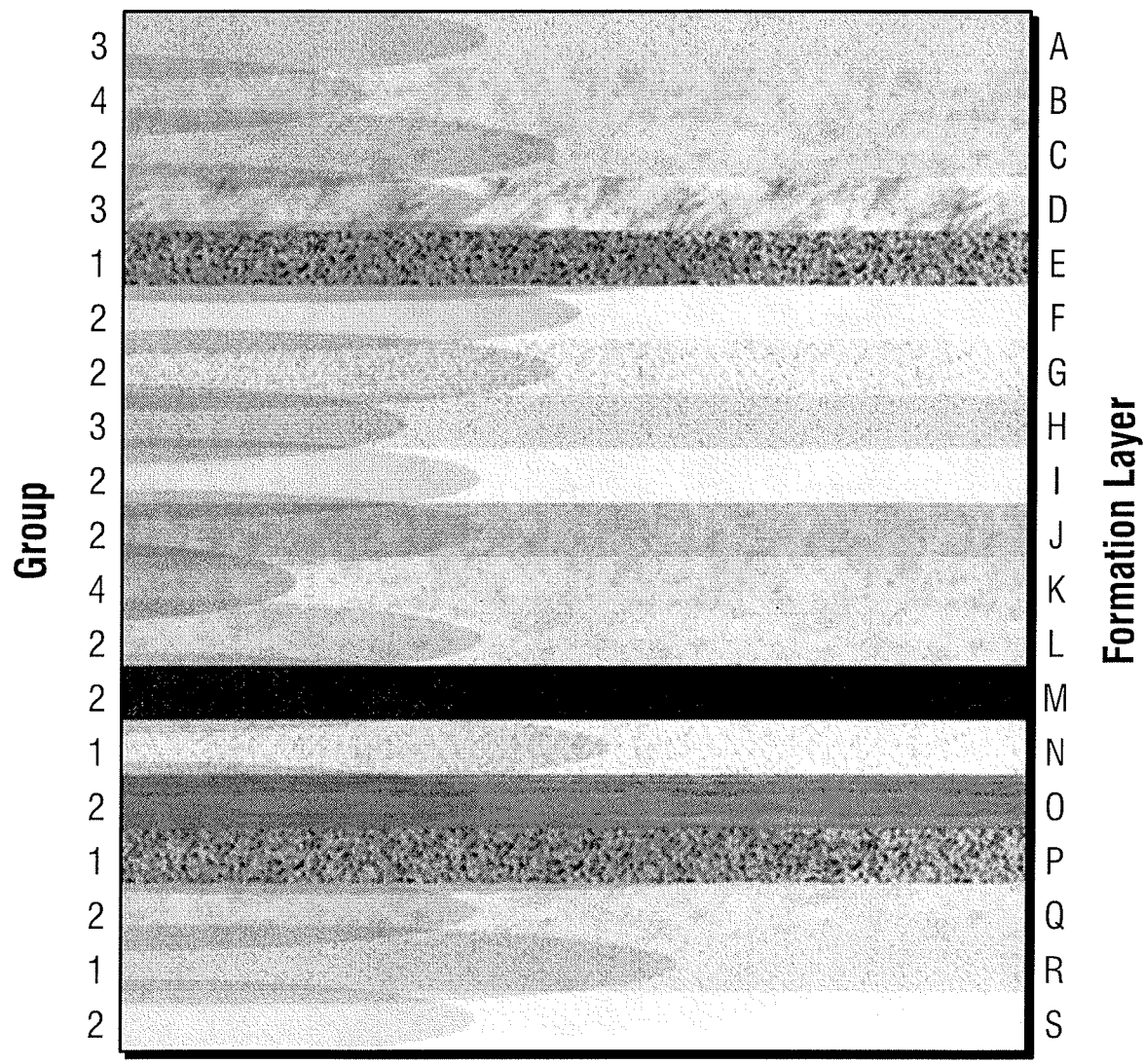
FIG. 10 is an example sequence for extending fractures in a downhole environment, according to aspects of the present disclosure.

FIG. 10 is an example sequence for extending fractures in a downhole environment, according to aspects of the present disclosure. In vertical and deviated wells any one or more fractures may extend through any one or more formation layers where each of the one or more formation layers comprises one or more types of formation. For example, the one or more types of formation may be sand, water, rock, hydrocarbon (for example, oil, gas, or both), any combination thereof, and variation of any quality thereof. For a given operation, a fracture may be of a specific shape to minimize or maximize the quality of a given layer. For example, for a formation layer comprised of water, the fracture size may be minimized whereas for a formation layer with a quality of high pressure, the fracture size may be maximized.

As illustrated in FIG. 10, a perforation system for a given operation may be disposed in a formation, such as formation 106, comprised of layers A through S. Any one or more layers A through S may comprise the same type of formation or a different type of formation and may comprise any one or more qualities. For example, a formation 106 may comprise any one or more of sandstone, carbonate, chalk, shale, water, hydrocarbons, any other type of rock, fluid or gas. One or more qualities of a formation 106 may comprise any one or more of liquid, gas, solid, hardness, softness, porous, impermeable, chemical or element composition or any other quality of interest for a given operation. A perforation system may be any one or more configurations according to any one or more aspects of the present disclosure. Any one or more container 600 or charge carrier 120 may be positioned at each layer A through S.

In one or more embodiments, it is determined which layers A through S are pressurized and productive. These pressurized and productive formation layers may be given a higher priority as extending fractures associated with these pressurized and productive formation layers produce the most benefit. The highest priority formation layers may be addressed prior to addressing any other formation layers or lower priority formation layers. In contrast, formation layers comprising mostly water may be addressed after these pressurized and productive layers or after all other formation layers have been addressed. The one or more formation layers A through S with similar qualities or of a similar type may be grouped together and associated with one or more containers 600 or charge carriers 120. A container 600 or charge carrier 120 may be positioned at each formation layer A through S and associated together as a group. For example, formation layers E, N, P and R are associated together as a first group (1), formation layers C, F, G, I, J, L, M, O, Q and S are associated together as a second group (2), formation layers A, D and H are associated together as a third group, and formation layers B and K are associated together as a fourth group (4). While only formation layers A-S are shown, the present disclosure contemplates any number of formation layers and any number of groupings of containers 600 or charge carriers 120 and any number of priority levels.

In one or more embodiments, group 1 is associated with pressurized and highly productive formation layers and is associated with the highest priority, group 2 is associated with lesser priority formation layers than group 1, group 3 is associated with lesser priority formation layers than group 2 and group 4 is associated with the least priority formation layers. As previously discussed, a pad fluid may be initially pumped into a wellbore 108 to pressurize the annulus whereupon the one or more containers 600 or charge carriers 120 associated with group 1 are excited to extend the corresponding fractures. Pumping of pad fluid may continue for a period of time (for example, two or three minutes, or any other appropriate duration of time). The one or more containers 600 or charge carriers 120 associated with group 2 are excited to extend the corresponding fractures. The process is repeated for group 3 and group 4.

In one or more embodiments, a method of creating a perforation in a subterranean formation comprises deploying a plurality of charge carriers disposed in a wellbore of the formation at a predetermined distance and orientation from each other, wherein the plurality of charge carriers each comprises a shaped charge, wherein each shaped charge comprises a first electrically ignitable and electrically controllable explosive material (EIECEM), determining a predetermined sequence to ignite the first EIECEM of each shaped charge based, at least in part, on a perforation to be created in the formation, igniting the first EIECEM of each shaped charge by exciting independently an electrical current at each shaped charge based, at least in part, on the predetermined sequence, wherein igniting the first EIECEM of each shaped charge causes an explosion of the first EIECEM of each shaped charge for a duration of the electrical current, and creating at least one perforation in the formation, wherein the at least one perforation is created based, at least in part, on the explosion of at least one of the first EIECEM of each shaped charge. In one or more embodiments, the method further comprises wherein igniting the first EIECEM of each shaped charge based, at least in part, on the predetermined sequence comprises circulating a first fluid in the wellbore and pressurizing the wellbore to a fracture pressure and pressurizing the wellbore to a fracture pressure, and wherein creating the at least one perforation in the formation comprises creating a first fracture by surging the first fluid into the at least one perforation, circulating a second fluid in the wellbore and displacing the second fluid by circulating the first fluid to cause an increase in pressure in the wellbore. In one or more embodiments, the method further comprises wherein the second fluid comprises a temporary plugging agent to create a diversion from the first fracture to a second fracture. In one or more embodiments, the method further comprises disposing a first charge carrier of the plurality of charge carriers at a first location within the wellbore, disposing a second charge carrier of the plurality of charge carriers at a second location within the wellbore, wherein the second location is a first predetermined distance from the first location, disposing a third charge carrier of the plurality of charge carriers at a third location within the wellbore, wherein the third location is between the first location and the second location, and wherein the third location is a second predetermined distance between the first location and the third location and a third predetermined distance between the second location and the third location and wherein igniting the first EIECEM of each shaped charge based, at least in part, on the predetermined sequence comprises exciting the electrical current at the first EIECEM associated with each shaped charge of the first charge carrier for a first duration of time, delaying a first predetermined amount of time, exciting the electrical current at the first EIECEM associated with each shaped charge of the second charge carrier for a second duration of time, and exciting the electrical current at the first EIECEM associated with each shaped charge of the third charge carrier for a third duration of time. In one or more embodiments, the method further comprises wherein igniting the first EIECEM of each shaped charge comprises inducing a first electrical current to cause a first explosion of the first EIECEM of at least one shaped charge to collapse a shaped object of the at least one shaped charge, wherein the first EIECEM causes the first explosion for a duration of the first electrical current, discontinuing inducement of the first electrical current, inducing a second electrical current within a predetermined time interval of the first electrical current to cause a second explosion of the first EIECEM of at least one of shaped charge, and wherein the first EIECEM causes the second explosion for a duration of the second electrical current. In one or more embodiments, the method further comprises wherein determining the predetermined sequence comprises grouping, into at least a plurality of groups, the plurality of charge carriers based, at least in part, on one or more characteristics of the formation and determining a priority for each group of the at least a plurality of groups, wherein igniting the first EIECEM of each shaped charge based, at least in part, on the predetermined sequence comprises igniting the first EIECEM for each shaped charge based, at least in part, on the determined priority for each group of the at least a plurality of groups. In one or more embodiments, the method further comprises wherein at least one of the plurality of charge carriers is disposed within a container, wherein a second EIECEM is disposed within the container, and wherein a conductor is electrically coupled to the second EIECEM and exciting the conductor with a second electrical current to ignite the second EIECEM, wherein the second EIECEM causes a second explosion for a duration of the second electrical current.

In one or more embodiments, a system comprises a plurality of charge carriers disposed in a wellbore of a formation at a predetermined distance and orientation from each other, a plurality of shaped charges disposed within the plurality of charge carriers, wherein each of the plurality of charge carriers comprises at least one of the plurality of shaped charges, a first plurality of electrically ignitable and electrically controllable explosive materials (EIECEMs) disposed within each of the plurality of shaped charges and a conductor coupled to the plurality of shaped charges, wherein the conductor is configured to induce a first electrical current at the plurality of shaped charges based, at least in part, on a predetermined sequence for igniting the first plurality of EIECEMs, wherein the first plurality of EIECEMs are configured to explode for a duration of the first electrical current to create at least one perforation of the formation. In one or more embodiments, the system further comprises a first fluid circulated in the at least one perforation, wherein the circulated first fluid is configured to create a first fracture from the at least one perforation when the wellbore is pressurized to a fracture pressure and a second fluid circulated within the wellbore, wherein the circulated second fluid is configured to be displaced by the circulated first fluid to cause an increase in pressure in the wellbore. In one or more embodiments, the system further comprises a temporary plugging agent disposed within the second fluid, wherein the temporary plugging agent is configured to create a diversion from the first fracture to a second fracture. In one or more embodiments, a first charge carrier of the plurality of charge carriers disposed at a first location within the wellbore, a second charge carrier of the plurality of charge carriers disposed at a second location within the wellbore, a third charge carrier of the plurality of charge carriers disposed at a third location within the wellbore, wherein the third location is between the first location and the second location, and wherein the third location is a second predetermined distance between the first location and the third location and a third predetermined distance between the second location and the third location and wherein the first charge carrier is configured to ignite at least one of the first plurality of EIECEMs of the at least one of the plurality of shaped charges associated with first charge carrier based, at least in part, on the predetermined sequence, wherein the second charge carrier is configured to ignite at least one of the first plurality of EIECEMs of the at least one of the plurality of shaped charges associated with second charge carrier after a first predetermined delay based, at least in part, on the predetermined sequence, and wherein the third charge carrier is configured to ignite at least one of the first plurality of EIECEMs of the at least one of the plurality of shaped charges associated with third charge carrier after a second predetermined delay based, at least in part, on the predetermined sequence. In one or more embodiments, the system further comprises wherein each of the plurality of shaped charges comprises a shaped object, wherein each of the first plurality of EIECEMs is disposed about a corresponding shaped object, wherein the shaped object is configured to collapse when the corresponding first plurality of EIECEMs explode during inducement of the first electrical current for a first duration, and wherein the first plurality of EIECEMS are configured to further explode during inducement of the first electrical current for a second duration. In one or more embodiments, the system further comprises at least one container disposed about at least one of the plurality of charge carriers, wherein the at least one container comprises a second EIECEM and a second conductor electrically coupled to the second EIECEM, wherein the second conductor is configured to induce a second electrical current at the second EIECEM to ignite the second EIECEM to cause a second explosion to further expand the at least one perforation.

In one or more embodiments, a system for creating a perforation in a subterranean formation comprises a plurality of charge carriers disposed in a wellbore of the formation each at a predetermined distance and orientation from each other, a plurality of shaped charges disposed within the plurality of charge carriers, wherein each of the plurality of charge carriers comprises at least one of the plurality of shaped charges, and wherein each of the plurality of shaped charges comprises an electrically ignitable and electrically controllable explosive material (EIECEM) and an information handling system communicably coupled to the plurality of charge carriers, the information handling system comprises a processor and memory device coupled to the processor, the memory device containing a set of instructions that, when executed by the processor, cause the processor to determine a predetermined sequence to ignite the EIECEM of each of the plurality of shaped charges based, at least in part, an a perforation to be created in the formation and excite independently an electrical current for a predetermined duration at the plurality of shaped charges to ignite the EIECEM of each of the plurality of shaped charges based, at least in part, on the predetermined sequence, wherein igniting the EIECEM of each of the plurality of shaped charges causes an explosion of the EIECEM for the predetermined duration of the electrical current, wherein the EIECEM of each of the plurality of shaped charges is configured to create at least one perforation in the formation. In one or more embodiments, the system further comprises wherein the set of instructions when executed by the processor, further cause the processor to circulate a first fluid in the wellbore, determine when the wellbore has reached a fracture pressure, surging the first fluid into the at least one perforation to create a first fracture, circulate a second fluid in the wellbore, and recirculate the first fluid in the wellbore to displace the second fluid to increase pressure in the wellbore. In one or more embodiments, the system further comprises wherein the second fluid comprises a temporary plugging agent to create a diversion from the first fracture to a second fracture. In one or more embodiments, the system further comprises a first charge carrier of the plurality of charge carriers disposed at a first location in the wellbore, a second charge carrier of the plurality of charge carriers disposed at a second location downhole, wherein the second location is a first predetermined distance from the first location, a third charge carrier of the plurality of charge carriers disposed at a third location downhole, wherein the third location is between the first location and the second location, and wherein the third location is a second predetermined distance between the first location and the third location and a third predetermined distance between the second location and the third location, and wherein the set of instructions when executed by the processor, further cause the processor to: excite the electrical current associated with the EIECEM of each of the plurality of shaped charges of the first charge carrier for a first duration of time, delay a first predetermined amount of time, excite the electrical current associated with the EIECEM of the plurality of shaped charges of the second charge carrier for a second duration of time, delay a second predetermined amount of time and excite the electrical current associated with the EIECEM of the plurality of shaped charges of the third charge carrier for a third duration of time. In one or more embodiments, the system further comprises wherein the set of instructions that, when executed by the processor cause the processor to excite independently an electrical current for a predetermined duration at each of the plurality of shaped charges to ignite the EIECEM of the plurality of shaped charges based, at least in part, on the predetermined sequence further causes the processor to induce a first electrical current to cause a first explosion of the EIECEM associated with at least one of the plurality shaped charges to collapse a shaped object, wherein the EIECEM is disposed about the shaped object, discontinue inducement of the first electrical current and induce a second electrical current within a predetermined time interval of the first electrical current to cause a second explosion of the EIECEM associated with the at least one of the plurality of shaped charges. In one or more embodiments, the system further comprises wherein the set of instructions that, when executed by the processor cause the processor to determine the predetermined sequence, further cause the processor to group, into at least a plurality of groups, the plurality of charge carriers based, at least in part, on one or more characteristics of the formation and determine a priority for each group of the at least a plurality of groups, and wherein the set of instructions that, when executed by the processor cause the processor to excite the EIECEMs of each of the plurality of shaped charges based, at least in part, on the predetermined sequence further cause the processor to excite the EIECEMs for each of the plurality of shaped charges based, at least in part, on the determined priority for each group of the at least a plurality of groups. In one or more embodiments, the system further comprises at least one container disposed about at least one of the plurality of charge carriers, a first EIECEM disposed within the at least one container, wherein the conductor is electrically coupled to the first EIECEM and wherein the set of instructions that, when executed by the processor further cause the processor to excite the conductor to ignite the first EIECEM.

What is claimed is:

1. A method of creating a perforation in a subterranean formation, comprising:
    deploying a plurality of charge carriers disposed in a wellbore of the formation at a predetermined distance and orientation from each other, wherein the plurality of charge carriers each comprises a shaped charge, wherein each shaped charge comprises a first electrically ignitable and electrically controllable explosive material (EIECEM), wherein at least one of the plurality of charge carriers is disposed within a container, wherein a second EIECEM is disposed within the container, and wherein a conductor is electrically coupled to the second EIECEM;
    determining a predetermined sequence to ignite the first EIECEM of each shaped charge based, at least in part, on a perforation to be created in the formation;
    igniting the first EIECEM of each shaped charge by exciting independently an electrical current at each shaped charge based, at least in part, on the predetermined sequence, wherein igniting the first EIECEM of each shaped charge causes an explosion of the first EIECEM of each shaped charge for a duration of the electrical current;
    exciting the conductor with a second electrical current to ignite the second EIECEM, wherein the second EIECEM causes a second explosion for a duration of the second electrical current and
    creating at least one perforation in the formation, wherein the at least one perforation is created based, at least in part, on the explosion of at least one of the first EIECEM of each shaped charge.

2. The method of claim 1, wherein:
    igniting the first EIECEM of each shaped charge based, at least in part, on the predetermined sequence comprises:
    circulating a first fluid in the wellbore; and
    pressurizing the wellbore to a fracture pressure.

3. The method of claim 2, wherein creating at least one perforation in the formation comprises:
    creating a first fracture by surging the first fluid into the at least one perforation;
    circulating a second fluid in the wellbore; and
    displacing the second fluid by circulating the first fluid to cause an increase in pressure in the wellbore.

4. The method of claim 1, further comprising:
    disposing a first charge carrier of the plurality of charge carriers at a first location within the wellbore;
    disposing a second charge carrier of the plurality of charge carriers at a second location within the wellbore, wherein the second location is a first predetermined distance from the first location;
    disposing a third charge carrier of the plurality of charge carriers at a third location within the wellbore, wherein the third location is between the first location and the second location, and wherein the third location is a second predetermined distance between the first location and the third location and a third predetermined distance between the second location and the third location; and
    wherein igniting the first EIECEM of each shaped charge based, at least in part, on the predetermined sequence comprises:
    exciting the electrical current at the first EIECEM associated with each shaped charge of the first charge carrier for a first duration of time;
    delaying a first predetermined amount of time;
    exciting the electrical current at the first EIECEM associated with each shaped charge of the second charge carrier for a second duration of time;
    delaying a second predetermined amount of time; and
    exciting the electrical current at the first EIECEM associated with each shaped charge of the third charge carrier for a third duration of time.

5. The method of claim 1, wherein igniting the first EIECEM of each shaped charge comprises:
    inducing a first electrical current to cause a first explosion of the first EIECEM of each shaped charge to collapse a cone of each shaped charge, wherein the first EIECEM causes the first explosion for a duration of the first electrical current;
    discontinuing inducement of the first electrical current; and
    inducing a second electrical current within a predetermined time interval of the first electrical current to cause a second explosion of the first EIECEM of each shaped charge, wherein the first EIECEM causes the second explosion for a duration of the second electrical current.

6. The method of claim 1, further comprising:
    wherein determining the predetermined sequence comprises:

grouping a plurality of shaped charges into a plurality of groups, based, at least in part, on one or more characteristics of the formation, wherein there is at least a first group and a second group; and determining a priority for each group of the plurality of groups.

7. The method of claim 6, wherein igniting the first EIECEM of each shaped charge based, at least in part, on the predetermined sequence comprises:

igniting the first EIECEM for each shaped charge based, at least in part, on the determined priority for each group of the plurality of groups.

8. A system, comprising:

a plurality of charge carriers disposed in a wellbore of a formation at a predetermined distance and orientation from each other;

a plurality of shaped charges disposed within the plurality of charge carriers, wherein each of the plurality of charge carriers comprises at least one of the plurality of shaped charges;

a first of electrically ignitable and electrically controllable explosive material (EIECEM) disposed within each one of the plurality of shaped charges;

wherein at least one of the plurality of charge carriers is disposed within a container, wherein a second EIECEM is disposed within the container, and wherein a conductor is electrically coupled to the second EIECEM; and a conductor coupled to the plurality of shaped charges, wherein the conductor is configured to induce a first electrical current at the plurality of shaped charges based, at least in part, on a predetermined sequence for igniting the first EIECEM, wherein the first EIECEM is configured to explode for a duration of the first electrical current to create at least one perforation of the formation, wherein the conductor is electrically coupled to the second EIECEM, wherein the conductor is configured to be excited by a second electrical current to ignite the second EIECEM, wherein the second EIECEM causes a second explosion for a duration of the second electrical current.

9. The system of claim 8, further comprising:

a first fluid circulated in the at least one perforation, wherein the circulated first fluid is configured to create a first fracture from the at least one perforation when the wellbore is pressurized to a fracture pressure; and a second fluid circulated within the wellbore, wherein the circulated second fluid is configured to be displaced by the circulated first fluid to cause an increase in pressure in the wellbore.

10. The system of claim 8, further comprising:

a first charge carrier of the plurality of charge carriers disposed at a first location within the wellbore;

a second charge carrier of the plurality of charge carriers disposed at a second location within the wellbore; and a third charge carrier of the plurality of charge carriers disposed at a third location within the wellbore, wherein the third location is between the first location and the second location, and wherein the third location is a second predetermined distance between the first location and the third location and a third predetermined distance between the second location and the third location.

11. The system of claim 10, wherein the first charge carrier is configured to ignite the first EIECEM of the at least one of the plurality of shaped charges associated with first charge carrier based, at least in part, on the predetermined sequence, wherein the second charge carrier is configured to ignite the first EIECEM of the at least one of the plurality of shaped charges associated with second charge carrier after a first predetermined delay based, at least in part, on the predetermined sequence, and wherein the third charge carrier is configured to ignite the first EIECEM of the at least one of the plurality of shaped charges associated with third charge carrier after a second predetermined delay based, at least in part, on the predetermined sequence.

12. The system of claim 8, further comprising:

wherein each of the plurality of shaped charges comprises a cone, wherein the first EIECEM is disposed about a corresponding cone, wherein the cone is configured to collapse when the corresponding first EIECEM explode during inducement of the first electrical current for a first duration, and wherein the first EIECEM is configured to further explode during inducement of the first electrical current for a second duration.

13. A system for creating a perforation in a subterranean formation, comprising:

a plurality of charge carriers disposed in a wellbore of the formation each at a predetermined distance and orientation from each other;

a plurality of shaped charges disposed within the plurality of charge carriers, wherein each of the plurality of charge carriers comprises at least one of the plurality of shaped charges, and wherein each of the plurality of shaped charges comprises an electrically ignitable and electrically controllable explosive material (EIECEM); and an information handling system communicably coupled to the plurality of charge carriers, the information handling system comprises a processor and memory device coupled to the processor, the memory device containing a set of instructions that, when executed by the processor, cause the processor to:

determine a predetermined sequence to ignite the EIECEM of each of the plurality of shaped charges based, at least in part, a perforation to be created in the formation; and excite independently an electrical current for a predetermined duration at the plurality of shaped charges to ignite the EIECEM of each of the plurality of shaped charges based, at least in part, on the predetermined sequence, wherein igniting the EIECEM of each of the plurality of shaped charges causes an explosion of the EIECEM for the predetermined duration of the electrical current, wherein the EIECEM of each of the plurality of shaped charges is configured to create a perforation in the formation, wherein at least one of the plurality of charge carriers is disposed within a container, wherein a conductor is electrically coupled to the EIECEM, wherein the conductor is configured to be excited to ignite the EIECEM.

14. The system of claim 13, wherein the set of instructions when executed by the processor, further cause the processor to:

circulate a first fluid in the wellbore;

determine when the wellbore has reached a fracture pressure; and surge the first fluid into the perforation to create a first fracture.

15. The system of claim 14, wherein the set of instructions when executed by the processor, further cause the processor to:

circulate a second fluid in the wellbore; and recirculate the first fluid in the wellbore to displace the second fluid to increase pressure in the wellbore.

16. The system of claim 13, further comprising:
a first charge carrier of the plurality of charge carriers disposed at a first location in the wellbore;
a second charge carrier of the plurality of charge carriers disposed at a second location downhole, wherein the second location is a first predetermined distance from the first location; and
a third charge carrier of the plurality of charge carriers disposed at a third location downhole, wherein the third location is between the first location and the second location, and wherein the third location is a second predetermined distance between the first location and the third location and a third predetermined distance between the second location and the third location.

17. The system of claim 16, wherein the set of instructions when executed by the processor, further cause the processor to:
excite the electrical current associated with the EIECEM of each of the plurality of shaped charges of the first charge carrier for a first duration of time;
delay a first predetermined amount of time;
excite the electrical current associated with the EIECEM of the plurality of shaped charges of the second charge carrier for a second duration of time;
delay a second predetermined amount of time; and
excite the electrical current associated with the EIECEM of the plurality of shaped charges of the third charge carrier for a third duration of time.

18. The system of claim 13, wherein the set of instructions that, when executed by the processor cause the processor to excite independently an electrical current for a predetermined duration at each of the plurality of shaped charges to ignite the EIECEM of the plurality of shaped charges based, at least in part, on the predetermined sequence further causes the processor to:
induce a first electrical current to cause a first explosion of the EIECEM associated with at least one of the plurality shaped charges to collapse a cone, wherein the EIECEM is disposed about the cone;
discontinue inducement of the first electrical current; and
induce the second electrical current within a predetermined time interval of the first electrical current to cause the second explosion of the EIECEM associated with the at least one of the plurality of shaped charges.

19. The system of claim 13, further comprising:
wherein the set of instructions that, when executed by the processor cause the processor to determine the predetermined sequence, further cause the processor to:
group a plurality of shaped charges into a plurality of groups, based, at least in part, on one or more characteristics of the formation, wherein there is at least a first group and a second group; and
determine a priority for each group of the plurality of groups; and
wherein the set of instructions that, when executed by the processor cause the processor to excite the EIECEMs of each of the plurality of shaped charges based, at least in part, on the predetermined sequence further cause the processor to:
excite the EIECEMs for each of the plurality of shaped charges based, at least in part, on the determined priority for each group of the plurality of groups.

* * * * *